US010273422B2

(12) United States Patent
Jack et al.

(10) Patent No.: US 10,273,422 B2
(45) Date of Patent: Apr. 30, 2019

(54) INTEGRATED BIOFUELS PROCESS CONFIGURATIONS, EMPLOYING A 2-STAGE BIO-REFORMING REACTOR SYSTEM, IN WHICH RENEWABLE CARBON CONTENT OF GASOLINE AND DIESEL ARE OPTIMIZED FOR VALUE

(71) Applicant: Sundrop Fuels, Inc., Longmont, CO (US)

(72) Inventors: Douglas S. Jack, Longmont, CO (US); Renus C. Kelfkens, Longmont, CO (US); Steve C. Lythgoe, Littleton, CO (US); Wayne W. Simmons, Longmont, CO (US)

(73) Assignee: Sundrop Fuels, Inc., Longmont, CO (US)

(*) Notice: Subject to any disclaimer, the term of this patent is extended or adjusted under 35 U.S.C. 154(b) by 0 days.

(21) Appl. No.: 15/946,952

(22) Filed: Apr. 6, 2018

(65) Prior Publication Data
US 2018/0291295 A1 Oct. 11, 2018

Related U.S. Application Data

(60) Provisional application No. 62/483,104, filed on Apr. 7, 2017.

(51) Int. Cl.
*C10G 1/00* (2006.01)
*C07C 1/00* (2006.01)
(Continued)

(52) U.S. Cl.
CPC .............. *C10L 3/08* (2013.01); *B01D 53/047* (2013.01); *B01J 8/1872* (2013.01); *C10L 5/44* (2013.01);
(Continued)

(58) Field of Classification Search
USPC .......................... 585/240, 242, 310; 208/49
See application file for complete search history.

(56) References Cited

U.S. PATENT DOCUMENTS

| 8,814,961 | B2 | 8/2014 | Perkins et al. |
| 8,961,628 | B2 | 2/2015 | Ampulski et al. |
| 9,011,560 | B2 | 4/2015 | Simmons et al. |
| 9,126,173 | B2 | 9/2015 | Ampulski et al. |

(Continued)

FOREIGN PATENT DOCUMENTS

| WO | 2013148610 A1 | 10/2013 |
| WO | 2013158343 A1 | 10/2013 |

(Continued)

*Primary Examiner* — Thuan D Dang
(74) *Attorney, Agent, or Firm* — Rutan & Tucker, LLP

(57) ABSTRACT

A bio-reforming reactor receives biomass to generate chemical grade syngas for a coupled downstream train of any of 1) a methanol-synthesis-reactor train, 2) a methanol-to-gasoline reactor train, and 3) a high-temperature Fischer-Tropsch reactor train, that use this syngas derived from the biomass in the bio-reforming reactor. A renewable carbon content of the produced gasoline, jet fuel, and/or diesel derived from the coupled downstream trains of any of 1) the methanol-synthesis-reactor train, 2) the methanol-to-gasoline reactor train, or 3) the high-temperature Fischer-Tropsch reactor train are optimized for recovery of renewable carbon content to produce fuel products with 100% biogenic carbon content and/or fuel products with 50-100% biogenic carbon content. A carbon-dioxide gas feedback loop cooperates with a CO2 separation unit to supply a fraction of the CO2 gas that is removed from the chemical grade syngas produced from the reactor output of the BRR to supply extracted CO2 gas to the biomass feed system.

20 Claims, 9 Drawing Sheets

(51) Int. Cl.
*C10L 3/08* (2006.01)
*B01J 8/18* (2006.01)
*C10L 5/44* (2006.01)
*B01D 53/047* (2006.01)

(52) U.S. Cl.
CPC . *C01B 2203/1235* (2013.01); *C10L 2200/043* (2013.01); *C10L 2200/0423* (2013.01); *C10L 2200/0476* (2013.01); *C10L 2200/0492* (2013.01); *C10L 2290/02* (2013.01); *C10L 2290/04* (2013.01); *C10L 2290/28* (2013.01); *C10L 2290/42* (2013.01); *C10L 2290/56* (2013.01)

(56) References Cited

U.S. PATENT DOCUMENTS

| | | |
|---|---|---|
| 9,295,961 B2 | 3/2016 | Laska et al. |
| 9,416,077 B2 | 8/2016 | Kelfkens et al. |
| 9,447,326 B2 | 9/2016 | Ferraro et al. |
| 9,663,363 B2 | 5/2017 | Simmons et al. |
| 2013/0247448 A1 | 9/2013 | Ampulski et al. |
| 2013/0248760 A1 | 9/2013 | Ampulski et al. |
| 2014/0241949 A1 | 8/2014 | Perkins et al. |
| 2014/0341785 A1 | 11/2014 | Simmons et al. |
| 2016/0152905 A1 | 6/2016 | Kelfkens et al. |
| 2017/0066983 A1 | 3/2017 | Jack et al. |

FOREIGN PATENT DOCUMENTS

| | | |
|---|---|---|
| WO | 2013191897 A1 | 12/2013 |
| WO | 2014043552 A1 | 3/2014 |
| WO | 2014204519 A1 | 12/2014 |
| WO | 2016086141 A1 | 6/2016 |

INTEGRATED BIOFUELS PROCESS CONFIGURATIONS, EMPLOYING A 2-STAGE BIO-REFORMING REACTOR SYSTEM, IN WHICH RENEWABLE CARBON CONTENT OF GASOLINE AND DIESEL ARE OPTIMIZED FOR VALUE

RELATED APPLICATIONS

This application claims priority to U.S. provisional patent application Ser. No. 62/483,104, titled, "Integrated Biofuels Process Configurations, Employing a 2-Stage Bio-Reforming Reactor System, in which Renewable Carbon Content of Gasoline and Diesel are Optimized for Value," filed Apr. 7, 2017, and incorporates its contents in their entirety by reference.

FIELD

The design generally relates to an Integrated Process Plant having a biomass reforming reactor that uses one or more feedback loops in the plant to optimize the renewable carbon content.

BACKGROUND

Many economists plan for reducing global-warming emissions include different technologies to create, track, and measure an amount of renewable carbon in fuel sources. The renewable carbons in these fuels are a result of the biogenic content of the feedstocks used to create these fuels. The specific renewable (or biogenic) carbon content of these biofuels vary with the configuration of the production process.

SUMMARY

Apparatuses, methods, and systems are discussed for integrated biofuels process configurations that employ a 2-stage bio-reforming reactor system, in which renewable carbon content of gasoline, jet fuel and/or diesel fuel are optimized for value.

In an embodiment, an integrated plant may include a number of components including a bio-reforming reactor, a biomass feed system, one or more feedback loops, and one or more fuel product generation trains. The interconnected set of two or more stages of chemical reactors form a bio-reforming reactor that is configured to receive biomass in order to generate chemical grade syngas for a coupled downstream train of any of 1) a methanol-synthesis-reactor train, 2) a methanol-to-gasoline reactor train, and 3) a high-temperature Fischer-Tropsch reactor train, that use this syngas derived from the biomass in the bio-reforming reactor. A renewable carbon content of the produced gasoline, jet fuel, and/or diesel derived from the coupled downstream trains of any of 1) the methanol-synthesis-reactor train, 2) the methanol-to-gasoline reactor train, or 3) the high-temperature Fischer-Tropsch reactor train are optimized for recovery of renewable carbon content to produce any of 1) fuel products with 100% biogenic carbon content, 2) fuel products with 50-100% biogenic carbon, and 3) any combination of fuel products with solely 100% biogenic carbon content as well as fuel products with 50-100% biogenic carbon content. A first stage of the bio-reforming reactor includes a circulating fluidized bed reactor that has one or more stream inputs to feed heat absorbing media, including silica sand, ilmenite, olivine, dolomite, zeolite catalysts and any combination of the five, a vessel to circulate the heat absorbing media, one or more feed supply inputs to feed biomass from the biomass feed system to the circulating fluidized bed reactor, and a sparger to input steam at or near a bottom of the circulating fluidized bed reactor. The circulating fluidized bed reactor of the first stage causes chemical reactions of the biomass into its reaction products of constituent gases, tars, chars, and other components, which exit through an output from the circulating fluidized bed of the first stage. A tubular chemical reactor of a second stage of the bio-reforming reactor that has an input configured to receive a stream of some of the reaction products from the output from the circulating fluidized bed, via a cyclone, that includes the constituent gases and then chemically reacts the raw syngas within the tubular chemical reactor of the second stage to make the raw syngas from the first stage into the chemical grade syngas by further processing including cracking and/or reforming the 1) tars, 2) light hydrocarbons (C1-C4), or 3) both into their constituent molecules so that a resultant chemical grade syngas stream going out a reactor output of the tubular chemical reactor can be used as a chemical feedstock in other chemical reactions in the above coupled downstream trains of the integrated plant rather than just being a source of a fuel gas for other components. One or more feedback loops connect to at least the tubular chemical reactor of the second stage include a carbon-dioxide gas feedback loop that cooperates with a CO2 separation unit to supply a fraction of the CO2 gas that is removed from the chemical grade syngas produced from the reactor output of the tubular chemical reactor of the second stage to supply extracted CO2 gas to the biomass feed system. The CO2 gas may be supplied to at least biomass dryers to dry and be motive gas for the biomass. The biomass may be subsequently supplied to the one or more feed supply inputs of the circulating fluidized bed reactor.

BRIEF DESCRIPTION OF THE DRAWINGS

The multiple drawings refer to the example embodiments of the design.

Figure 1A:
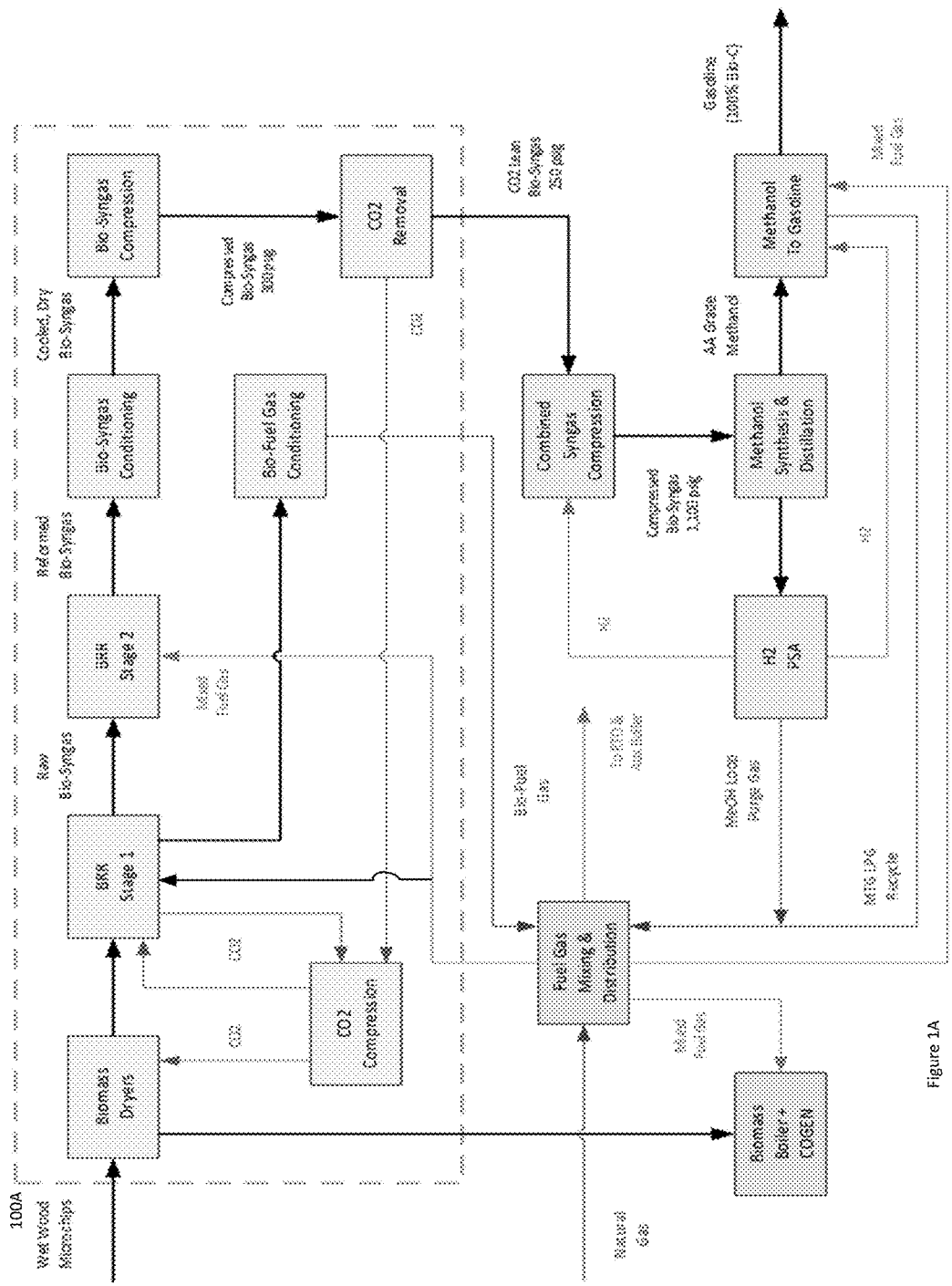
FIG. 1A illustrates a diagram of an embodiment of integrated plant with an interconnected set of two or more stages of reactors.

While the design is subject to various modifications and alternative forms, specific embodiments thereof have been shown by way of example in the drawings and will herein be described in detail. The design should be understood to not be limited to the particular forms disclosed, but on the contrary, the intention is to cover all modifications, equivalents, and alternatives falling within the spirit and scope of the design.

DETAILED DISCUSSION

In the following description, numerous specific details are set forth, such as examples of specific chemicals, named components, connections, types of heat sources, specific numeric values given for an example design, etc., in order to provide a thorough understanding of the present design. It will be apparent, however, to one skilled in the art that the present design may be practiced without these specific details. In other instances, well known components or methods have not been described in detail but rather in a block diagram in order to avoid unnecessarily obscuring the present design. Further, specific numeric references such as first reactor, can be made. However, the specific numeric reference should not be interpreted as a literal sequential order but rather interpreted that the first reactor is different than a second reactor. Thus, the specific details set forth are merely exemplary. The specific details can be varied from and still be contemplated to be within the spirit and scope of the present design. The term coupled is defined as meaning connected either directly to the component or indirectly to the component through another component. Concepts discussed for a first embodiment may be implemented in another embodiment where that is logically possible.

In general, a number of example processes for and apparatuses associated with a biomass conversion are described. The following drawings and text describe various example implementations and operating configurations for an integrated plant. The integrated biofuels plant configurations may employ a 2-stage bio-reforming reactor system, in which the renewable carbon content of gasoline, jet fuel, diesel fuel, and/or similar fuels, are optimized for value to include: 1) Products with 100% biogenic carbon content and 2) Products with 50-100% biogenic carbon.

FIG. 1A illustrates a diagram of an embodiment of integrated plant with an interconnected set of two or more stages of reactors.

The integrated plant 100A may consist of multiple connected components including a multiple stage bio-reforming reactor, a biomass feed system, one or more feedback loops connected to at least the tubular chemical reactor of the second stage, a methanol-synthesis-reactor train, and many other connected components in order to produce any of 1) fuel products with 100% biogenic carbon content, 2) fuel products with 50-100% biogenic carbon, and 3) any combination of fuel products with solely 100% biogenic carbon content as well as fuel products with 50-100% biogenic carbon content.

An interconnected set of two or more stages of chemical reactors form the bio-reforming reactor that is configured to receive biomass in order to generate chemical grade syngas for a coupled downstream train of any of 1) a methanol-synthesis-reactor train, 2) a methanol-to-gasoline reactor train, and 3) a high-temperature Fischer-Tropsch reactor train, that use this syngas derived from the biomass in the bio-reforming reactor. A renewable carbon content of gasoline, jet fuel, and/or diesel derived from the coupled downstream trains of any of 1) the methanol-synthesis-reactor train, 2) the methanol-to-gasoline reactor train, or 3) the high-temperature Fischer-Tropsch reactor train are optimized for recovery of renewable carbon content to produce any of 1) fuel products with 100% biogenic carbon content, 2) fuel products with 50-100% biogenic carbon, and 3) any combination of fuel products with solely 100% biogenic carbon content as well as fuel products with 50-100% biogenic carbon content.

The biomass feed system supplies biomass chips, such as wood chips, from a mill or onsite chipper into a biomass dryer system.

A first stage of the bio-reforming reactor includes a circulating fluidized bed reactor that has one or more stream inputs to feed heat absorbing media, including silica sand, ilmenite, olivine, dolomite, zeolite catalysts and any combination of the five, a vessel to circulate the heat absorbing media, one or more feed supply inputs to feed biomass from the biomass feed system to the circulating fluidized bed reactor, and a sparger to input steam at or near a bottom of the circulating fluidized bed reactor. The circulating fluidized bed reactor of the first stage is configured to cause chemical reactions of the biomass into its reaction products of constituent gases, tars, chars, and other components, which exit through an output from the circulating fluidized bed of the first stage. The raw bio-syngas, for eventual methanol production, is sent to the tubular chemical reactor in the second stage for tar conversion/cracking and reforming methane and other light hydrocarbons (C1-C4) in the stream from the output of the first stage in order for the second stage to produce chemical grade bio-syngas. The tubular chemical reactor of a second stage of the bio-reforming reactor has an input configured to receive a stream of some of the reaction products from the output from the circulating fluidized bed via a cyclone that includes the constituent gases, including carbon monoxide, hydrogen, carbon dioxide, methane and other light hydrocarbons (C1-C4), tars, etc., and then chemically reacts this raw syngas within the tubular chemical reactor of the second stage to make the raw syngas from the first stage into the chemical grade syngas by this further processing including cracking and/or reforming the 1) tars, 2) light hydrocarbons (C1-C4), or 3) both into their constituent molecules so that a resultant chemical grade syngas stream can be supplied out of the reactor output of the tubular chemical reactor. The chemical grade syngas can be used as a chemical feedstock in other chemical reactions in the above coupled downstream trains of the integrated plant 100A rather than just being a source of a fuel gas for other components. The second stage includes heaters for the tubular chemical reactor of the second stage to maintain an operating temperature of that reactor of at least 700 degree C. The second stage heats up to crack the tars and reform of the light hydrocarbons (C1-C4) in the syngas with a catalyst in order to remove those components from the syngas that are harmful for subsequent chemical reactions and processes.

One or more feedback loops connect to at least the tubular chemical reactor of the second stage including a carbon-dioxide gas feedback loop.

The integrated plant 100A includes a first recycling loop of carbon-based gases from the system processes to be reused in other parts of the integrated system in order to have a 50%-100% biogenic rating. The biomass dryer receives its $CO_2$ motive gas as well as heated $CO_2$ gas to dry the biomass from recycled $CO_2$ gas from a carbon dioxide compressor. The $CO_2$ gas is derived and recycled from the chemical grade bio syngas coming from the reactor output of the tubular chemical reactor of the second stage after that syngas has gone through the syngas conditioning components, the syngas compression component, and a $CO_2$ removal unit. The $CO_2$ removal unit separates $CO_2$ from the bio syngas. The $CO_2$ removal unit sends the carbon dioxide to a carbon dioxide compressor. The carbon dioxide compressor supplies the heated recycled $CO_2$ gases to the biomass dryer as well as to a lock hopper system that uses $CO_2$ gas. The lock hopper uses the $CO_2$ gas to pressurize; and thus, move the wood chips to go across the pressure boundary into the first stage/gasifier of the bio-reforming reactor. Thus, the biomass, such as wood chips, is supplied to the one or more feed supply inputs of the circulating fluidized bed reactor. The circulating fluidized bed reactor of the bio reforming reactor will gasify and cause chemical reactions of those wood chips to break down the complex molecular chemical bonds making up the wood chip into its constituent parts of char, methane, hydrogen, carbon oxide, steam, and other parts.

Overall, a fraction of the $CO_2$ gas is removed from the chemical grade bio-syngas to supply $CO_2$ gas to the lock-hoppers and biomass dryers in the biomass feed system. If necessary, more bio-syngas $CO_2$ gas is removed to satisfy a minimum methanol feed modulus ratio (or Ribblett ratio for the Fischer-Tropsch process).

Next, the integrated plant 100A includes a second recycling loop of carbon-based gases from the system processes to be reused in other parts of the integrated system in order to achieve a one hundred percent biogenic rating. A fuel gas mixing and distribution component is configured to receive fuel gas from a number of sources, such as natural gas, a tail/purge gas from a hydrogen pressure swing absorber from the downstream methanol-synthesis-reactor train that takes in the chemical grade syngas as a chemical feedstock to generate methanol, and a tail/purge gas from the downstream methanol-to-gas train that takes in the methanol as a chemical feedstock. The fuel gas mixing and distribution component distributes that fuel gas to a number of plant systems.

For example, the fuel gas mixing and distribution component distributes that fuel gas via a fuel gas feedback loop of hydrogen and/or carbon-based gases that connect to the heaters for the tubes of the tubular chemical reactor in order to crack the tars and reform the light hydro carbons (C1-C4). The bio-reforming reactor receives the fuel gas for its heaters to apply fire to the tubes of the second stage of the bio-reforming reactor. The heaters of the second stage reactor get the operating temperature of that reactor up. The fuel gas recycling loop allows reuse of these tail/purge gases from the system processes in other parts of the integrated system in order to have a one hundred percent biogenic rating.

The mixed fuel gas comes from the fuel gas mixing and distribution component. The fuel gas mixing and distribution component distributes that fuel gas to the heaters in the second stage of the bio reformer reactor as well as fuel gas to supply the boilers for making supplemental steam and sends fuel gas for heaters in the methanol to gasoline trains.

Another source of fuel gas is the first stage reactor. A fraction of the raw bio-syngas from the output of the reactor in the first Stage is used as fuel gas to fire heaters in the second Stage, MTG fired heaters, the auxiliary boiler, and the Regenerative Thermal Oxidizer (RTO), via the fuel gas mixing and distribution component.

Note, boilers may be used for supplemental steam. The boilers for supplemental steam also receive woodchips to act as a fuel to be mixed with the mixed fuel gas to supply the energy needed for the supplemental boiler for the steam generation for a steam-driven electrical-generator.

Next, the methanol-synthesis-reactor train couples downstream of the $CO_2$ separation unit and a syngas compression unit to receive the chemical grade syngas as a chemical feedstock in order to generate methanol from the chemical grade syngas derived from the biomass. The methanol synthesis distillation train sends the produced methanol to the methanol to a further fuel making process.

Next, the integrated plant 100A includes a hydrogen recirculation feedback loop configured to recover hydrogen gas from the purge gas from the downstream methanol-synthesis-reactor train to be combined with the chemical grade syngas supplied from the tubular chemical reactor to provide local control of a methanol feed modulus ratio for a hydrogen to carbon monoxide ratio needed for methanol synthesis. The hydrogen pressure swing absorber is configured to receive the purge gas from the downstream methanol-synthesis-reactor train and extract hydrogen gas.

The hydrogen pressure swing absorber is configured to separate out the hydrogen gas from the purge gas from the methanol-synthesis-reactor train in order to recover the hydrogen gas from the purge gas. Note, any subsequent gasoline, diesel fuel, or jet fuel produced from the generated methanol in the methanol-to-gasoline reactor train or the high-temperature Fischer-Tropsch reactor train has a biogenic content of 100%.

The hydrogen pressure swing observer will send most of the pure hydrogen over to the input of the methanol synthesis distillation train to combine with the bio syngas and compress the combined gases for methanol synthesis with the combined gas mixed to achieve the appropriate ratio for the methanol synthesis distillation. The hydrogen pressure swing absorber is configured to also send hydrogen gas to the methanol-to-gasoline reactor train to change any ratios of produced gasoline to get a desired octane rating needed for commercial gasoline. The gasoline that is produced from the biomass, such as wood chips, is 100% biogenic.

In this integrated plant 100A configuration, the biomass and its constituent components are used for both process feeds and utilities. All required electrical power is generated using a biomass boiler and steam driven electrical generator. This configuration yields a 100% biogenic carbon product with the maximum life-cycle greenhouse gas reduction.

Figure 2A:
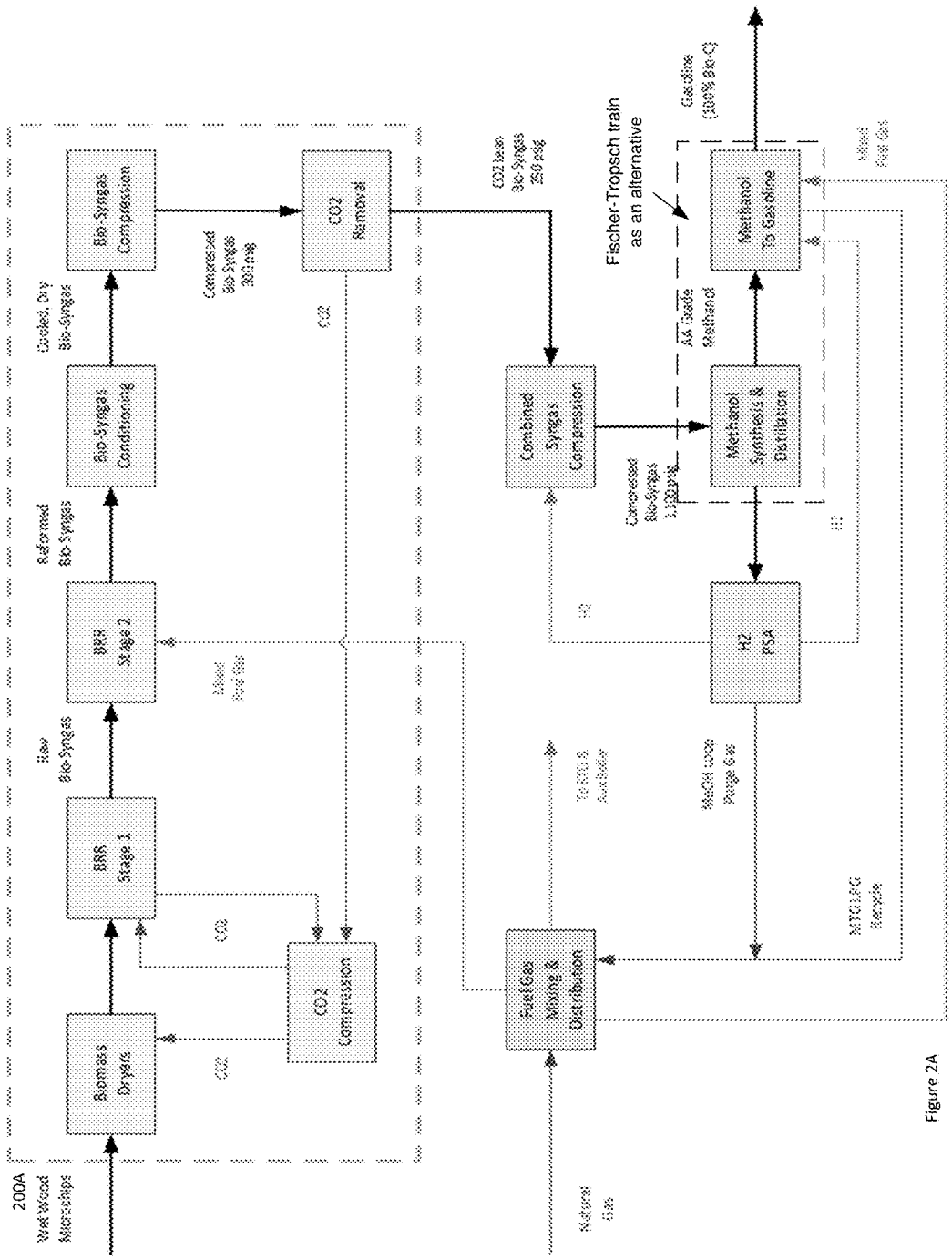
FIG. 2A illustrates a diagram of an embodiment of integrated plant with imported natural gas and electricity but still yield a 100% biogenic carbon product.

FIG. 2A illustrates a diagram of an embodiment of integrated plant with imported natural gas and electricity but still yield a 100% biogenic carbon product.

This integrated plant 200A includes some similar components to FIG. 1A. For example, raw bio-syngas is generated by the biomass reforming reactor stage 1. The raw bio-syngas is sent to the BRR Stage 2 for tar conversion and reforming of methane plus light hydrocarbons (C1-C4) to produce bio-syngas. The $CO_2$ gas recirculation loop still cooperates with a $CO_2$ separation unit to supply a fraction of the $CO_2$ that is removed from the chemical grade bio-syngas coming out of the second stage to supply $CO_2$ to the biomass feed system to the first stage of the bio-reforming reactor. The $CO_2$ is supplied to both i) lock-hoppers connecting to the one or more feed supply inputs of the first stage and ii) the biomass dryers connecting to the lock hoppers in order for the chemical grade syngas produced from the reactor output of the tubular chemical reactor of the second stage. The fuel gas mixing and distribution unit distributes fuel gases from purge gases to various heaters in the plant. The hydrogen pressure swing absorber is used to recover hydrogen from purge gases for use in the methanol synthesis train and MTG train. However, the supplemental boiler that receives woodchips to generate electricity is eliminated so that electricity is imported.

In addition, the fuel gas mixing and distribution unit as an input receives natural gas in addition to the purge gases from both the methanol to gasoline train and the hydrogen pressure swing absorber. Thus, natural gas and recycled gas from the methanol and MTG processes are used as fuel gas to fire BRR Stage 2, MTG fired heaters, the auxiliary boiler and the Regenerative Thermal Oxidizer.

This configuration of the integrated plant 200A yields a 100% biogenic carbon product with a high life-cycle greenhouse gas reduction using significantly less biomass than the configuration in FIG. 1A.

Figure 3A:
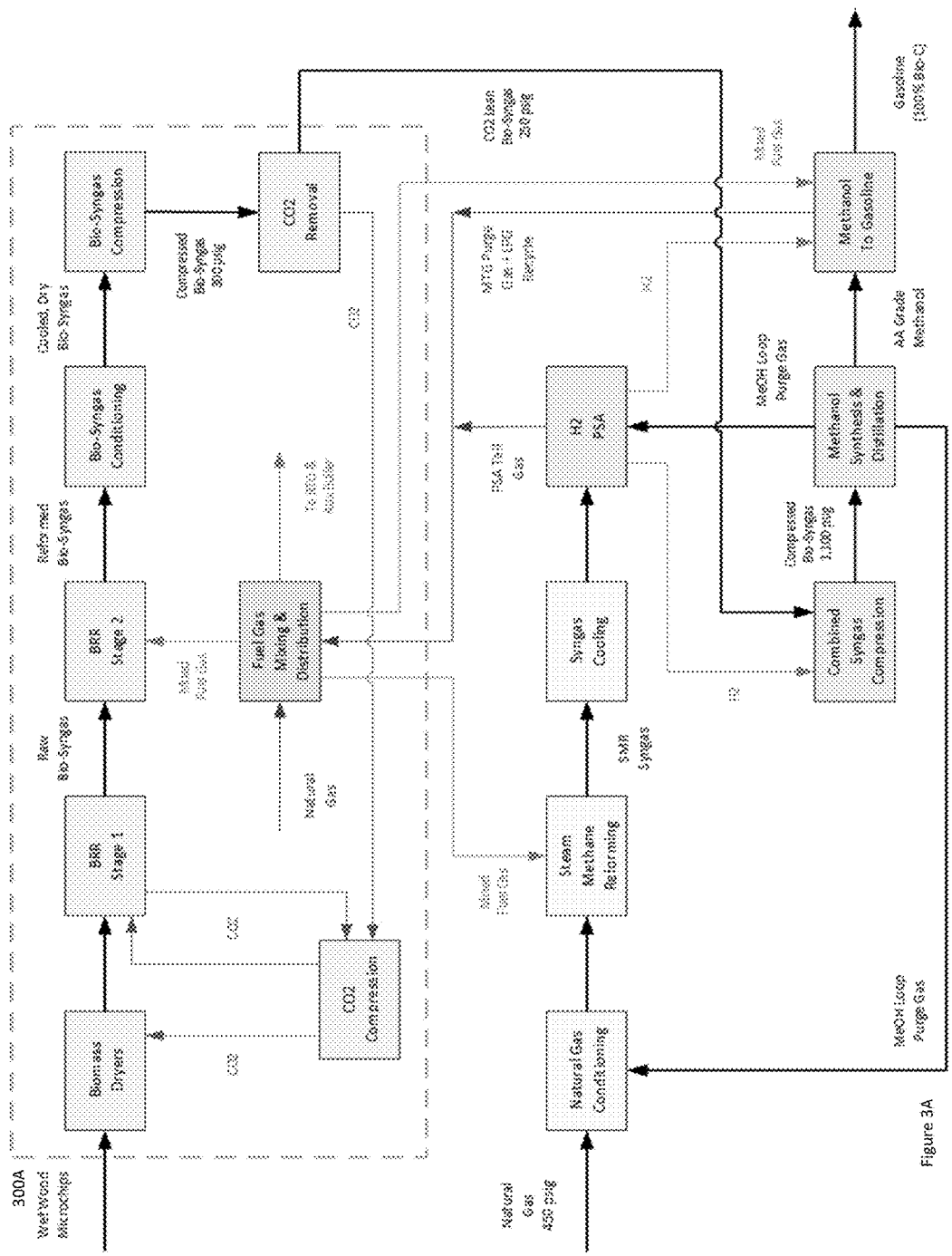
FIG. 3A illustrates a diagram of an embodiment of integrated plant with a steam methane reformer to generate a stream of hydrogen-rich gases.

FIG. 3A illustrates a diagram of an embodiment of integrated plant with a steam methane reformer to generate a stream of hydrogen-rich gases.

This integrated plant 300A includes some similar components to FIG. 1A. For example, raw bio-syngas is generated by the biomass reforming reactor stage 1. The raw bio-syngas is sent to the BRR Stage 2 for tar conversion and reforming of methane plus light hydrocarbons (C1-C4) to produce bio-syngas. The CO2 gas recirculation loop still cooperates with a CO2 separation unit to supply a fraction of the CO2 that is removed from the chemical grade bio-syngas coming out of the second stage to supply CO2 to the biomass feed system. The fuel gas mixing and distribution unit distributes fuel gases from purge gases to various heaters in the plant. The hydrogen pressure swing absorber is used to recover hydrogen from purge gases for use in the methanol synthesis train and Methanol To Gasoline train.

The fuel gas mixing and distribution unit as an input also receives natural gas in addition to the purge gases from both the methanol to gasoline train and the hydrogen Pressure Swing Absorber. The fuel gas mixing and distribution unit receives natural gas to supplement any needs that it may need to heat up these different trains and components. The fuel gas mixing and distribution components distributes the fuel gas to the second stage of the bio-reforming reactor to drive the heaters to fire the tubes of the reactor to heat up that reactor. The fuel gas mixing and distribution unit also sends the mixed fuel gas to a steam methane reformer for its heaters. The fuel gas mixing and distribution unit also sends the mixed fuel gas to an auxiliary boiler.

Natural gas also comes into a natural gas conditioning unit to be combined as a chemical stock feed with the purging gas from the methanol synthesis distillation train. The methanol synthesis loop purge gas is recycled back to the SMR, via the natural gas conditioning unit, to recover hydrogen and convert recycled methane. The purge gas may be heavy on carbon-based gases and light in hydrogen because the hydrogen pressure swing absorber will recover the hydrogen. The natural gas augments the hydrogen content. This mixed chemical feedstock is supplied to a chemical feed input into the steam methane reformer. The steam methane reformer generates a stream of exit gases selected from a group consisting of 1) hydrogen gas, 2) a hydrogen-rich syngas composition, in which a ratio of hydrogen-to-carbon monoxide is higher than a ratio generally needed for methanol synthesis, and 3) any combination of the two, to be mixed with a potentially carbon-monoxide-rich syngas composition, in which a ratio of carbon monoxide to hydrogen is higher than the ratio generally needed for methanol synthesis from the chemical grade syngas produced by the second stage. Thus, the hydrogen may be produced from both natural gas using a Steam Methane Reformer (SMR) and hydrogen PSA extracting hydrogen. The nearly pure hydrogen is mixed with the carbon-rich chemical grade bio-syngas to yield syngas that satisfies the methanol loop feed modulus requirement (or Ribblett ratio for when a Fischer-Tropsch process replaces the methanol synthesis and MTG sections).

The hydrogen pressure swing absorber is configured to separate out the hydrogen gas from the purge gas from the methanol-synthesis-reactor train and supply a hydrogen mix from the exit gases of the steam methane reformer and hydrogen from the purge gas into the syngas combiner and compression unit. The syngas combiner and compression unit is configured to receive chemical feedstock gas from all three of i) the chemical grade syngas produced by the second stage, ii) the exit gases from the steam methane reformer, and iii) the hydrogen from the hydrogen pressure swing absorber, to locally control a methanol feed modulus ratio for a hydrogen to carbon monoxide ratio needed for methanol synthesis.

The fuel gas mixing and distribution unit has a natural gas input to receive natural gas in addition to a purge gas input to receive purge gases from both a methanol-to-gasoline reactor train and the hydrogen pressure swing absorber connected to the methanol-synthesis-reactor train. The PSA tail gas is used as fuel gas. The fuel gas mixing and distribution unit is configured to receive natural gas to supplement any needs that it may need to supply the fuel gas needed to heat up different trains and components. The fuel gas mixing and distribution components distributes the fuel gas to at least i) heaters in the second stage of the bio reform and reactor to drive the heaters to fire the tubes of the tubular chemical reactor to heat up that reactor, and ii) heaters of the steam methane reformer for its heaters. In an embodiment, Natural gas, PSA tail gas, MTG purge gas, and LPG are used as fuel gas to fire BRR Stage 2, the SMR furnace, MTG fired heaters, the auxiliary boiler and the RTO.

Note, all electricity is imported from the national electrical power utility grid. This configuration of the integrated plant 300A yields a 100% biogenic carbon product with a satisfactory life-cycle greenhouse gas reduction using near minimum biomass.

Figure 4A:
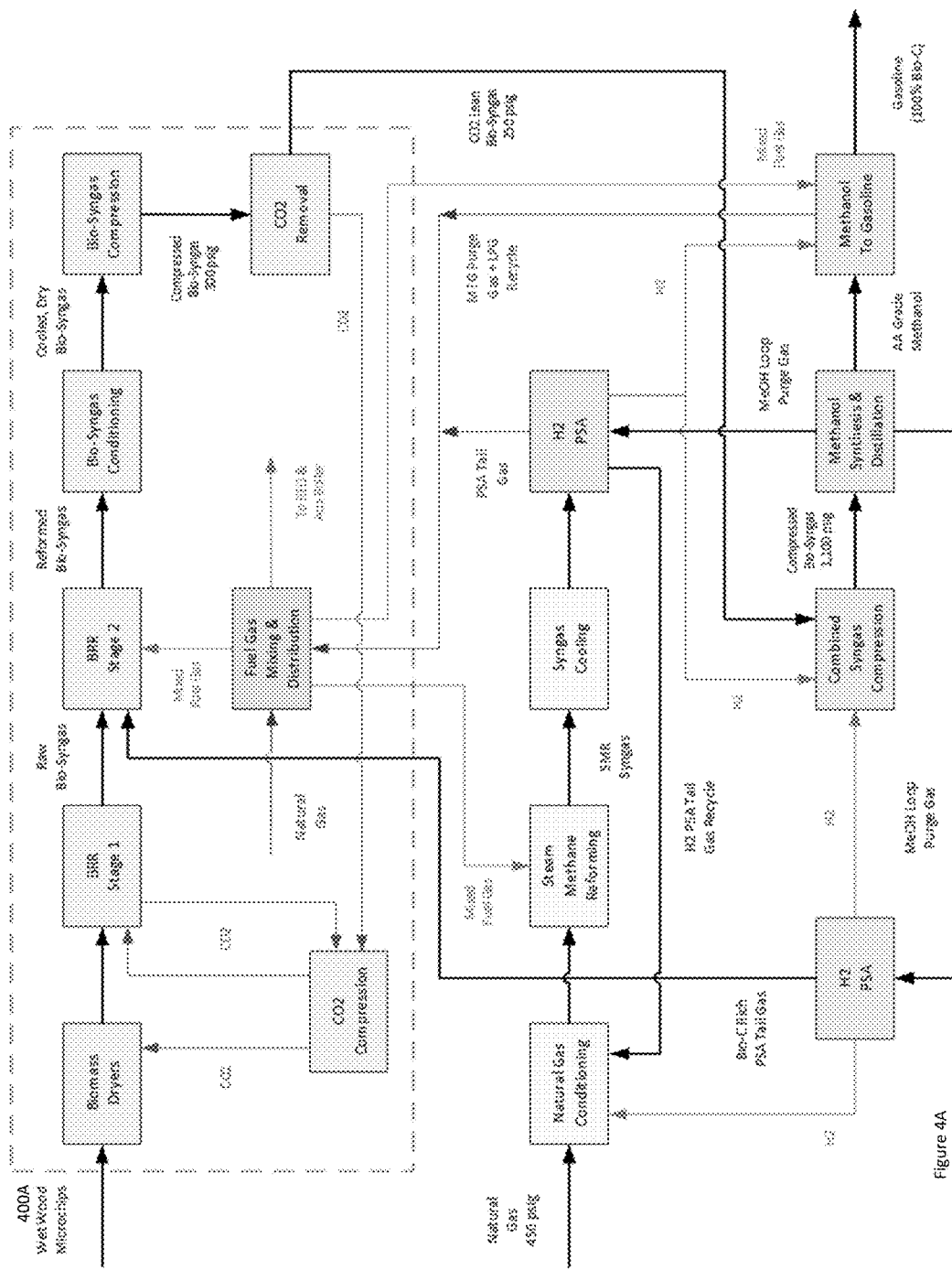
FIG. 4A illustrates a diagram of an embodiment of integrated plant with the tubular chemical reactor of the second stage receiving chemical feedstock from two sources, i) the raw syngas from the output of the reactor of the first stage, and ii) purge gas from the methanol-synthesis-reactor train.

FIG. 4A illustrates a diagram of an embodiment of integrated plant with the tubular chemical reactor of the second stage receiving chemical feedstock from two sources, i) the raw syngas from the output of the reactor of the first stage, and ii) purge gas from the methanol-synthesis-reactor train.

This is a very similar integrated plant 400A configuration as FIG. 3A; however, a separate second hydrogen PSA unit is used to recover hydrogen from the methanol synthesis loop and MTG purge gases. The PSA tail gas is recycled back to tubular chemical reactor in Stage 2 to conserve biogenic carbon.

A natural gas conditioning unit has a natural gas input as well as one or more purge gas inputs. The natural gas conditioning unit is configured to receive purge gases from the hydrogen pressure swing absorber as well as purge gases from the methanol-to-gasoline reactor train. These purge gas components are being used as a chemical feedstock to be mixed with another chemical feed stock of natural gas from the natural gas input. An output from the natural gas conditioning unit supplies the mixed chemical feedstock into a chemical feed input for the steam methane reformer.

The hydrogen pressure swing absorber may send some hydrogen to the natural gas conditioning unit in order be combined with the natural gas for the downstream steam methane reformer. The hydrogen will help to prevent coking of any of the initial tubes or catalyst in the steam methane reformer. The hydrogen pressure swing absorber will also send the pure hydrogen to the methanol synthesis distillation train to combine with the bio syngas and to the methanol to gasoline to change the ratios of the gasoline.

At the steam methane reformer, natural gas and the purging gas from the methanol synthesis distillation train come into a chemical feed input into the steam methane reformer as a chemical stock feed. The steam methane reformer generates a stream of exit gases selected from a group consisting of 1) hydrogen gas, 2) a hydrogen-rich syngas composition, in which a ratio of hydrogen-to-carbon monoxide is higher than a ratio generally needed for methanol synthesis, and 3) any combination of the two, to be mixed with a potentially carbon-monoxide-rich syngas composition, in which a ratio of carbon monoxide to hydrogen is higher than the ratio generally needed for methanol synthesis from the chemical grade syngas produced by the second stage. Steam Methane Reforming $CH_4 + H_2O \Leftrightarrow CO + 3\ H_2$. The methanol-synthesis-reactor train couples downstream of the CO2 separation unit and downstream of the steam methane reformer to receive the chemical grade syngas as a chemical feedstock and the hydrogen rich gas to generate methanol from the chemical grade syngas derived from the biomass.

The tubular chemical reactor of the second stage of bio reforming reactor has one or more inputs configured to receive chemical feedstock from two sources, i) the raw syngas from the output of the reactor of the first stage, and ii) purge gas from the methanol-synthesis-reactor train that is recycled back to the tubular chemical reactor of the bio reforming reactor to recover hydrogen and carbon-based purge gases to be converted into the chemical grade syngas produced by the reactor output of the tubular chemical reactor of the second stage.

The first stage of the BRR may include the circulating fluidized bed reactor coupled with a char combustor. The char combustor is configured to heat and supply the circulating heat absorbing media to the one or more inputs into the circulating fluidized bed reactor. The fuel gas mixing and distribution component receives fuel gas from a number of sources such as natural gas, a tail/purge gas from a hydrogen pressure swing absorber from the downstream methanol-synthesis-reactor train, and a tail/purge gas from a downstream methanol-to-gas train. Note, the methanol-to-gas train receives its methanol from the methanol-synthesis-reactor train. The fuel gas mixing and distribution component distributes that fuel gas via a fuel gas feedback loop of hydrogen and/or carbon-based gases that connect to the char combustor to supply fuel gas. The methanol-to-gas train is configured to produce gasoline with the biogenic content between 50% and 100%. The integrated system may also use biomass-derived-gases for biogenic carbon and natural gas for hydrogen but still yield a 100% biogenic carbon product with a satisfactory life-cycle greenhouse gas reduction using minimum biomass.

Figure 5A:
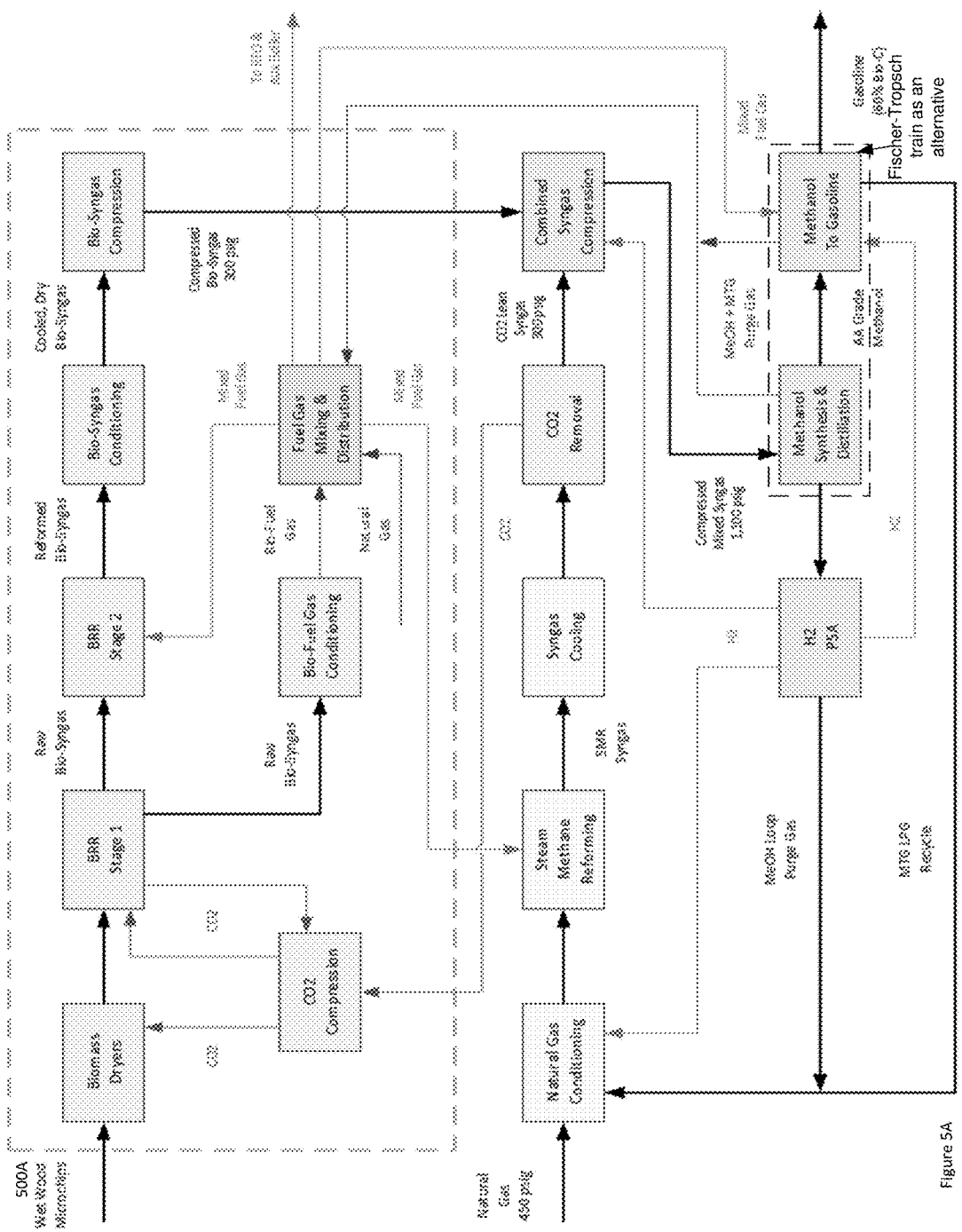
FIG. 5A illustrates a diagram of an embodiment of integrated plant with syngas coming from biomass and hydrogen gas from the steam methane reformer in order to get the proper combination of hydrogen to CO ratio needed for methanol synthesis or Fischer-Tropsch processes.

FIG. 5A illustrates a diagram of an embodiment of integrated plant with syngas coming from biomass and hydrogen enriched syngas from the steam methane reformer in order to get the proper combination of hydrogen to CO ratio needed for methanol synthesis or Fischer-Tropsch processes.

The natural gas conditioning block receives purge gases from the hydrogen pressure swing absorber as well as purge gases from the methanol to gasoline train. These purge gas components are being used as chemical feedstock to be mixed with the natural gas when the natural gas is supplied to the steam methane reformer. The steam methane reformer is configured to provide substantially hydrogen.

The first stage is configured to supply the raw syngas from the circulating fluidized bed reactor from the output from the circulating fluidized bed of the first stage to both i) the tubular chemical reactor of the second stage and ii) a fuel gas mixing and distribution unit to supply fuel gas to heaters of other plant components including the heaters of the second stage and heaters in the methanol-to-gas train. Thus, a fraction of the raw bio-syngas is used as fuel gas. The integrated plant system may also use biomass-derived-gases for biogenic carbon and natural gas for hydrogen and yield fuel products with 50-100% biogenic carbon. This integrated plant 500A configuration can be used to maximize gasoline production while meeting a minimum life-cycle greenhouse gas reduction. Further, the ability to produce gasoline from natural gas decreases revenue risk during start-up of the BTS section.

In an embodiment, at the syngas combiner and compression unit, the exit gases from the steam methane reformer are combined with the chemical grade syngas from the biomass reformer reactor to produce syngas products to be supplied to an input of the downstream Fischer-Tropsch train. The steam-methane reformer and hydrogen pressure swing absorber combine to provide hydrogen to correct a composition of a hydrogen to carbon monoxide ratio of the biomass-derived syngas supplied to the input of the downstream Fischer-Tropsch train so that the combined stream is at a suitable H2 to CO ratio for chemical synthesis for the Fischer-Tropsch train. The chemical grade syngas of the bio reforming reactor and chemical reaction products of the steam methane reformer and the hydrogen pressure swing absorber are combined to achieve a proper Hydrogen (H2) to Carbon Monoxide (CO) ratio between 1.5 to 2.4 for the Fischer-Tropsch synthesis, with either a cobalt (Co) catalyst or an iron (Fe) catalyst, and does not include a water gas shift stage to adjust the H2 to CO ratio. In an embodiment, the plant sensors monitor a different ratio called the Ribblett ratio which takes into account the CO2 content of the inlet syngas for the high temperature Fischer-Tropsch train. This may be an important factor as the CO2 conversion in the HTFT process represents a significant advantage for high temperature Fischer-Tropsch over low temperature Fischer-Tropsch. The Ribblet ratio may be H2 divided (2 times CO plus 3 times CO2) on a molar basis.

The steam-methane reformer 1016 converts light hydrocarbons and oxygenates at a thermodynamic equilibrium by the time these chemical reactants reach the outlet of the steam-methane reformer 1016.

An example high temperature Fischer-Tropsch train may have the mixed syngas feed preheated to 450° F. (232° C.) by a cross-exchange with a product stream in a heat exchanger. The preheated feed then enters a conversion reactor, where the syngas goes through iterative chemical reaction loops to be converted to the F-T slate of products.

The high temperature Fischer-Tropsch process may be configured to produce enhanced olefin yield based on predicted yields for a new precipitative catalyst formulation. The natural gas liquid (NGL) by-product from the high temperature Fischer-Tropsch process is sent to an oligomerization unit (COD), where the olefins in the NGL are oligomerized to gasoline and diesel range components with a product split, for example, of 55% gasoline and 45% diesel. The paraffins and unconverted olefins from the Oligomerization unit are recycled via the recycle loop back to the steam-methane reformer as feedstock. In an embodiment, alcohols recovered from the high temperature Fischer-Tropsch process water may be sent to the oligomerization unit where they are dehydrated and oligomerized to gasoline and diesel range components. Unconverted alcohols from the oligomerization unit may be combined with wastewater along with the balance of the water and other oxygenates from the high temperature Fischer-Tropsch process to be used as source for the steam supplied to the bio reforming reactor and the steam methane reformer. Heavy gas oil (HGO) from the high temperature Fischer-Tropsch process can be hydrocracked to diesel range components. The tail gas from the high temperature Fischer-Tropsch process can be arbitrarily split with 90% of the tail gas recycling to the steam-methane reformer as feedstock. The remaining 10% of the tail gas may be used to supply hydrogen to the hydrocracker and then burned as fuel gas to offset fuel gas consumption. The balance between natural gas and biomass-derived fuel gas is manipulated to maintain the same reduction in greenhouse gas emissions per gallon of product. The Natural Gas Liquids (NGL) that is recycled back into the plant may include C3 and C4 olefins and paraffins. The Conversion of Olefins to Distillate products (COD) in oligomerization unit uses several processes to convert low molecular weight olefins to higher molecular weight gasoline and diesel range components. The alcohols may be recovered and routed to the oligomerization unit for conversion to hydrocarbon products.

The Fischer-Tropsch process in the Fischer-Tropsch train is a collection of chemical reactions that converts a mixture of carbon monoxide and hydrogen into liquid hydrocarbons. The Fischer-Tropsch process involves a series of chemical reactions that produce a variety of hydrocarbons, ideally having the formula (CnH(2n+2)). Some example reactions produce alkanes as follows:

$$(2n+1)H_2 + nCO \rightarrow C_nH_{(2n+2)} + nH_2O$$

Where n is typically 10-20. Most of the alkanes produced tend to be straight chain, suitable such as diesel fuel. In addition to alkane formation, competing reactions give small amounts of alkenes, as well as alcohols and other oxygenated hydrocarbons. The HT Fischer-Tropsch and LT Fischer-Tropsch processes produce different amounts of olefins. HTFT produces a much more olefin rich syncrude than does LTFT, which affords better recycling back to other parts of the integrated plant. Converting a mixture of H2 and CO into aliphatic products with long hydrocarbon chains is generally a multi-step reaction with several sorts of intermediates.

High Temperature Fischer-Tropsch Reactor

The high temperature Fischer-Tropsch train may have the mixed syngas feed preheated to up to 450° F. (232° C.) by a cross-exchange with a product stream in a heat exchanger. The preheated mixed syngas feed then enters a conversion reactor, where the syngas goes through iterative chemical reaction loops to be converted to the F-T slate of products. The Table below summarizes the high temperature Fischer-Tropsch reactions. The example HTFT reactor operating conditions can be 640° F. (338° C.) and 425 PSIA.

Example High Temperature Fischer-Tropsch Product Reactions

| Product | Stoichiometry | Carbon Numbers |
|---|---|---|
| (3) Paraffin | $nCO + (2n + 1)H_2 \rightarrow C_nH_{(2n+2)} + nH_2O$ | 1-30 |
| (4) Olefin | $nCO + (2n)H_2 \rightarrow C_nH_{(2n)} + nH_2O$ | 2-30 |
| (5) Alcohol | $nCO + 2nH_2 \rightarrow C_nH_{(2n+2)} O + (n - 1)H_2O$ | 1-5 |
| (6) Aldehyde | $nCO + (2n - 1)H_2 \rightarrow C_nH_{(2n)} O + (n - 1)H_2O$ | 2-3 |
| (7) Ketone | $nCO + (2n - 1)H_2 \rightarrow C_nH_{(2n)} O + (n - 1)H_2O$ | 3-5 |
| (8) Acid | $nCO + (2n - 2)H_2 \rightarrow C_nH_{(2n)} O_2 + (n - 2)H_2O$ | 2-4 |

Example Carbon selectivity for each of the high temperature Fischer-Tropsch products is detailed in the Table below.

| Product | Selectivity |
|---|---|
| $CH_4$ | 7.961% |
| $C_2H_4$ | 6.404% |
| $C_2H_6$ | 0.747% |
| $C_3H_6$ | 12.51% |
| $C_3H_8$ | 0.477% |
| $C_4H_8$ | 9.756% |
| $C_4H_{10}$ | 0.241% |
| $C_5H_{10}$ | 9.300% |
| $C_5H_{12}$ | 0.476% |
| $C_6H_{12}$ | 5.924% |
| $C_6H_{14}$ | 0.305% |
| $C_7H_{14}$ | 8.049% |
| $C_7H_{16}$ | 0.415% |
| $C_8H_{16}$ | 6.194% |
| $C_8H_{18}$ | 0.320% |
| $C_9H_{18}$ | 4.766% |
| $C_9H_{20}$ | 0.247% |
| $C_{10}H_{20}$ | 3.697% |
| $C_{10}H_{22}$ | 0.192% |
| $C_{11}H_{22}$ | 2.848% |
| $C_{11}H_{24}$ | 0.148% |
| $C_{12}H_{24}$ | 2.195% |
| $C_{12}H_{26}$ | 0.114% |
| $C_{13}H_{26}$ | 1.691% |
| $C_{13}H_{28}$ | 0.088% |
| $C_{14}H_{28}$ | 1.303% |
| $C_{14}H_{30}$ | 0.068% |
| $C_{15}H_{30}$ | 1.004% |
| $C_{15}H_{32}$ | 0.052% |
| $C_{16}H_{32}$ | 0.773% |
| $C_{16}H_{34}$ | 0.040% |
| $C_{17}H_{34}$ | 0.596% |
| $C_{17}H_{36}$ | 0.031% |
| $C_{18}H_{36}$ | 0.459% |
| $C_{18}H_{38}$ | 0.024% |
| $C_{19}H_{38}$ | 0.354% |
| $C_{19}H_{40}$ | 0.018% |
| $C_{20}H_{40}$ | 0.273% |
| $C_{20}H_{42}$ | 0.014% |
| $C_{21}H_{42}$ | 0.904% |
| $C_{21}H_{44}$ | 0.047% |
| $C_{22}H_{44}$ | 0.762% |
| $C_{22}H_{46}$ | 0.040% |
| $C_{23}H_{46}$ | 0.642% |
| $C_{23}H_{48}$ | 0.034% |
| $C_{24}H_{48}$ | 0.541% |
| $C_{24}H_{50}$ | 0.028% |
| $C_{25}H_{50}$ | 0.456% |
| $C_{25}H_{52}$ | 0.024% |
| $C_{26}H_{52}$ | 0.385% |
| $C_{26}H_{54}$ | 0.020% |
| $C_{27}H_{54}$ | 0.324% |
| $C_{27}H_{56}$ | 0.017% |
| $C_{28}H_{56}$ | 0.273% |
| $C_{28}H_{58}$ | 0.014% |
| $C_{29}H_{58}$ | 0.230% |

-continued

| Product | Selectivity |
|---|---|
| $C_{29}H_{60}$ | 0.012% |
| $C_{30}H_{60}$ | 0.194% |
| $C_{30}H_{62}$ | 0.010% |
| $CH_3OH$ | 0.037% |
| $C_2H_5OH$ | 1.968% |
| $C_3H_7OH$ | 0.644% |
| $C_4H_9OH$ | 0.406% |
| $C_5H_{11}OH$ | 0.089% |
| $C_2H_4O$ | 0.111% |
| $C_3H_6O$ | 0.066% |
| $C_2H_6CO$ | 0.449% |
| $C_3H_8CO$ | 0.135% |
| $C_4H_{10}CO$ | 0.051% |
| $CH_3COOH$ | 0.657% |
| $C_2H_5COOH$ | 0.181% |
| $C_3H_7COOH$ | 0.175% |

The example chemical products from the Fischer-Tropsch reactor may be split. The C6 and higher molecules in the chart may be sent as products to the refiner stage to be made into a transportation fuel product. The C5 and lower molecules in the chart may be included in the tail gas that is recycled in the integrated plant.

Overall, all five of these example integrated plant configurations as shown in FIGS. 1A-5A, as well as combinations within these five, can be optimized for cost and complexity by sourcing biomass in different forms (i.e. wood chips in standard size (average 1.5"-2.5"), microchips, pellets, etc.). Where wood pellets are used instead of wood chips, the wood yard is substantially simplified and the biomass dryers are eliminated. This results in significantly less capital cost and electricity use.

The revenue stream of a renewable transportation fuel project is strongly affected by the biogenic carbon content of the final liquid fuel(s). In addition, feed stock variable cost differentials between biomass and natural gas influences economic decisions. Depending on the configuration, the process can be configured to produce gasoline, diesel or jet fuel where the biogenic content can be targeted between 50% and 100% in order to optimize project economics. The biogenic carbon target affects the capital cost requirements and integration of recycle streams allows for trade-offs and capital cost minimization. Although the life-cycle greenhouse gas reduction is always superior to a conventional refinery fuel process, it does vary depending on economic goals.

In the process configurations presented, the MTG process is used to produce gasoline from the methanol produced using syngas derived from biomass and potentially natural gas. These configurations can be modified to produce other liquid fuels from syngas such as Low Temperature Fischer-Tropsch (LTFT) to produce gasoline, diesel and/or jet fuel.

A Biomass to Gasoline process can be configured to use biomass or a combination of biomass and natural gas to produce a biogenic carbon rich syngas that is converted to methanol and gasoline. A goal is to maximize carbon efficiency and optimize the recovery of renewable carbon content into the syngas and fuel products for different business opportunities.

An integrated plant is discussed that includes a bio-reforming reactor consisting of two or more stages to generate syngas from biomass from the steam explosion unit, and any of a methanol synthesis reactor, a Methanol to Gasoline reactor train process, a low temperature Fischer-Tropsch reactor train, or another chemical process that uses the reaction syngas product derived from the biomass in the bio-reforming reactor.

Additional Discussion

The following drawings and text describe additional aspects of different embodiments of the design.

Figure 1B:
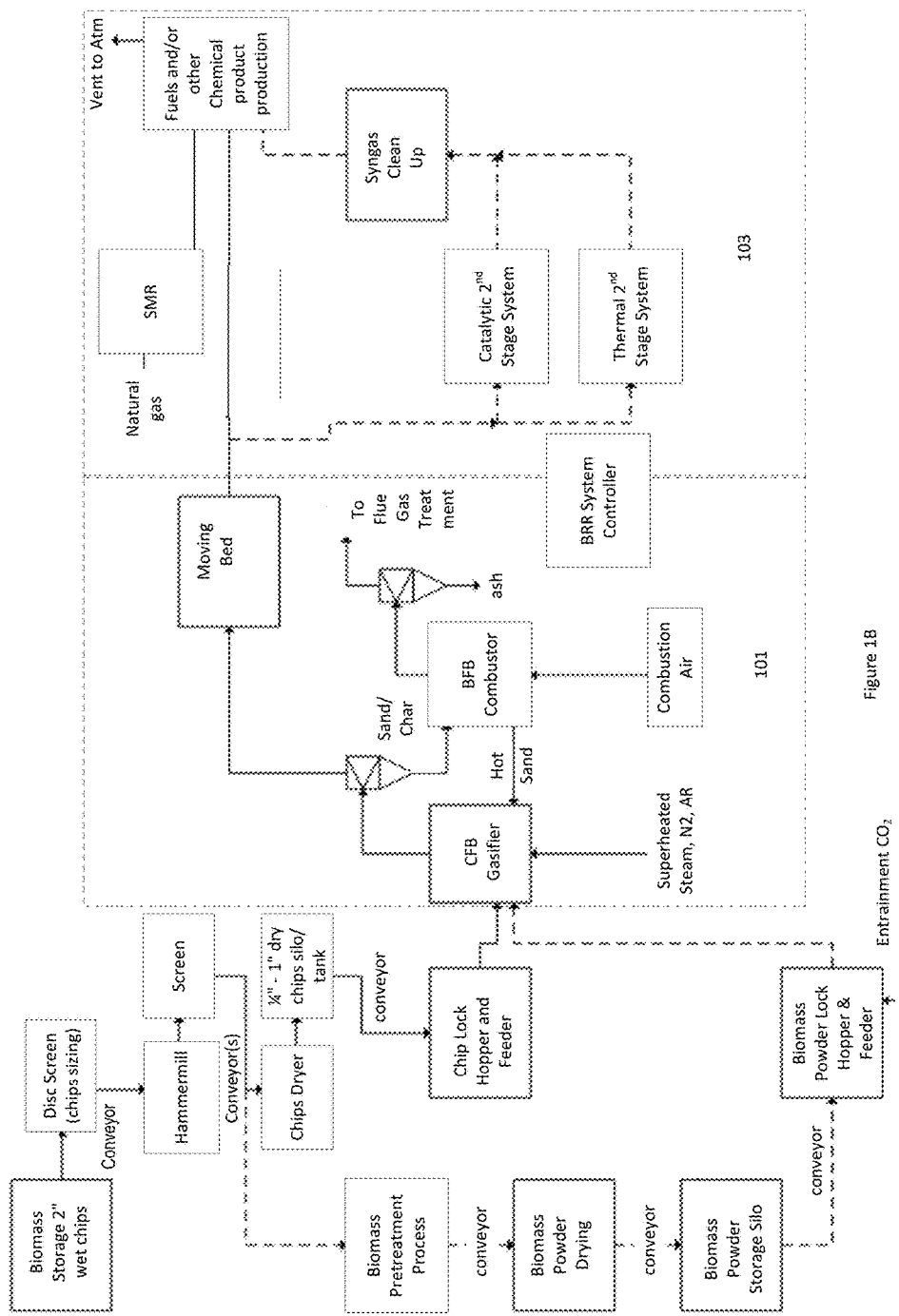
FIG. 1B illustrates a diagram of an embodiment of integrated plant with an interconnected set of two or more stages of reactors to form a bio-reforming reactor that generates syngas.

FIG. 1B illustrates a diagram of an embodiment of integrated plant with an interconnected set of two or more stages of reactors to form a bio-reforming reactor that generates syngas.

The integrated plant may have an interconnected set of two or more stages 101, 103 of reactors. An example first stage reactor 101 is meant to cause the devolatilization of woody biomass into its constituent gases, tars, chars, ash, and other components. In the first stage, devolatilization of woody biomass occurs by chemically bio-reforming or decomposing the biomass via a gasification of a steam-based reaction where the steam, as the oxidant, at a given temperature chemically decomposes the complex chains of molecules of the biomass into smaller molecules composed of 1) solids, such as char (unreacted carbon and ash), as well as 2) gases, such as hydrogen (H2), carbon monoxide (CO), carbon dioxide CO2, methane (CH4), etc. Thus, a decomposition reaction of the biomass through steam gasification occurs chemically, which may be referred to as bio-reforming. The second stage 103 of the reactor is meant to perform further clean up the syngas to make the raw syngas from the first stage 101 into chemical grade syngas by further cracking the tars and/or excess methane into their constituent molecules so that the resultant syngas stream can be used in other chemical reactions rather than just being a source of fuel for burning.

The integrated plant starting from biomass (dried or not dried) may feed a two-stage bio-reforming reactor (BRR) 101, 103. The bio-reforming reactor produces a chemical grade syngas to produce fuels or other chemicals such as Methanol (MEOH), Methanol to Gasoline (MTG), High Temperature Fischer Tropsch process (HTFT), Low Temperature Fischer Tropsch process (LTFT), etc. A Steam Methane Reactor may or may not be included with the integrated plant in order to supply extra hydrogen when combined with the syngas from the bio-reforming reactor. Biomass could be any non-food source biomass such as wood, sugarcane, bamboo, sawgrass, bagasse, palm empty fruit basket, corn stover, etc. In an embodiment, a low sulfur content woody biomass is chosen as the source biomass. In an embodiment, a combination of these biomass sources is chosen as can be supplied locally to the integrated plant.

The biomass feed system is configured to supply the biomass to one or more supply inputs into the circulating fluidized bed reactor in the first stage 101. The biomass feed system further includes any of 1) a rotary valve associated with a pressurized lock hopper system, 2) a rotary valve from a non-pressurized hopper, 3) a screw feeder system, or 4) combination of the above. A variety of sizes of the biomass such as dimensions of small fine particles, less than 500 microns, and/or chunks, such as an ¾ inch or half-inch or ¼ inch long chip of wood, and may be fed by the above variety of feeding mechanisms (e.g. a screw-type feeding mechanism, a lock hopper mechanism, etc.).

The biomass feed system supplies the biomass across a pressure boundary from atmospheric to above the operating pressure within the circulating fluidized bed reactor in the first stage 101. High pressure steam and gravity are used to supply the biomass through the one or more supply inputs across and out into the vessel of the circulating fluidized bed reactor to prevent backpressure on the biomass feed system and obtain better mixing throughout the vessel.

A first stage 101 of the bio-reforming reactor may include a circulating fluidized bed reactor that has one or more supply inputs to feed the biomass from the biomass feed system, one or more steam inputs to feed heat absorbing media, a vessel to circulate the heat absorbing media, and has a sparger to input steam. The heat absorbing media may include silica sand, ilmenite, olivine, dolomite, zeolite catalysts, and any combination of the five. In general, the biomass, steam, and heat absorbing media circulate in the vessel/fluidized bed of the reactor. The first stage 101 is configured to cause a chemical devolatilization of the biomass into its reaction products of constituent gases, tars, chars, and other components, which exit through a reactor output from the first stage 101.

The first stage 101 includes the circulating fluidized bed reactor coupled with a char combustor. Hot heat absorbing media for fluidization (e.g. the silica sand or olivine) may be circulated between the circulating fluidized bed gasifier and the char combustor, providing most of the necessary heat to gasify the incoming biomass and utilizing the char produced in the circulating fluidized bed reactor. The char combustor could be a bubbling fluidized bed or as a circulating fluidized bed (riser configuration). The char combustor is configured to heat and supply the circulating heat absorbing media to the one or more stream inputs into the circulating fluidized bed reactor. The reactor output from the first stage 101 couples to a primary cyclone and dipleg that has an outlet to the bubbling fluidized bed char combustor. The char combustor may or may not have supplemental fuel added in the form of natural gas, propane, fuel gas, torch oil, kerosene, or additional biomass. The operating temperature of the char combustor will be about 100-150 C above the temperature of the circulating fluidized bed reformer. The char combustor will have an outlet (return to the circulating fluidized bed reformer) for the circulating media either through a first stage 101 cyclone in the case of the circulating fluidized bed combustor or an overflow (or underflow) port to a standpipe in the case of the bubbling bed combustor configuration.

The second stage reactor 103 of the bio-reforming reactor may contain a radiant heat reactor that either 1) operates at a high enough temperature such that no catalyst is needed to decompose the tars and excess methane in the syngas stream or 2) operates with a catalyst at a lower temperature and then occasionally rejuvenates the catalyst in the second stage 103.

The second stage 103 of the bio-reforming reactor has an input configured to receive a stream of some of the reaction products that includes 1) the constituent gases and 2) at least some of the tars as raw syngas, and then chemically reacts the raw syngas within a vessel of the second stage 103 to make the raw syngas from the first stage 101 into a chemical grade syngas by further cracking the tars, excess methane, or both into their constituent molecules so that a resultant syngas stream going out a reactor output of the second stage 103 can be used in other chemical reactions rather than just being a source of fuel for burning.

In an embodiment, the catalytic reactor in the second stage 103 removes a substantial amount of tars and methane remaining in the raw syngas. The catalytic reactor reacts with the raw syngas to create a resultant chemical grade synthesis gas that is substantially tar-free, (less than 100 ppm total tars including benzene and naphthalene and more likely less than 5 ppm) and with a methane content as low as 0.5%% (dry basis) and certainly no higher than 10% (dry basis).

Going back to stage 1, a candle filter or moving bed may be an exit component from stage 1 or an entry component into stage 2. The syngas from stage 1 may be sent to either a candle filter, which could operate as high as 900 C; a secondary cyclone for dust removal; or to a packed or moving bed of, for example, olivine, ilmenite, or dolomite, which could act as both a filter and a tar destroyer. If syngas from stage 1 goes through the candle filter, the integrated plant may still pass syngas to the olivine or dolomite bed for tar destruction.

The interconnected set of two or more stages of reactors 101, 103 form a bio-reforming reactor that generates syngas for any of 1) a methanol synthesis reactor, 2) a Methanol to Gasoline reactor train process, 3) a low temperature Fischer-Tropsch reactor train, 4) another transportation fuel process, and 5) any combination of these, that use syngas derived from biomass in the bio-reforming reactor.

Figure 2B:
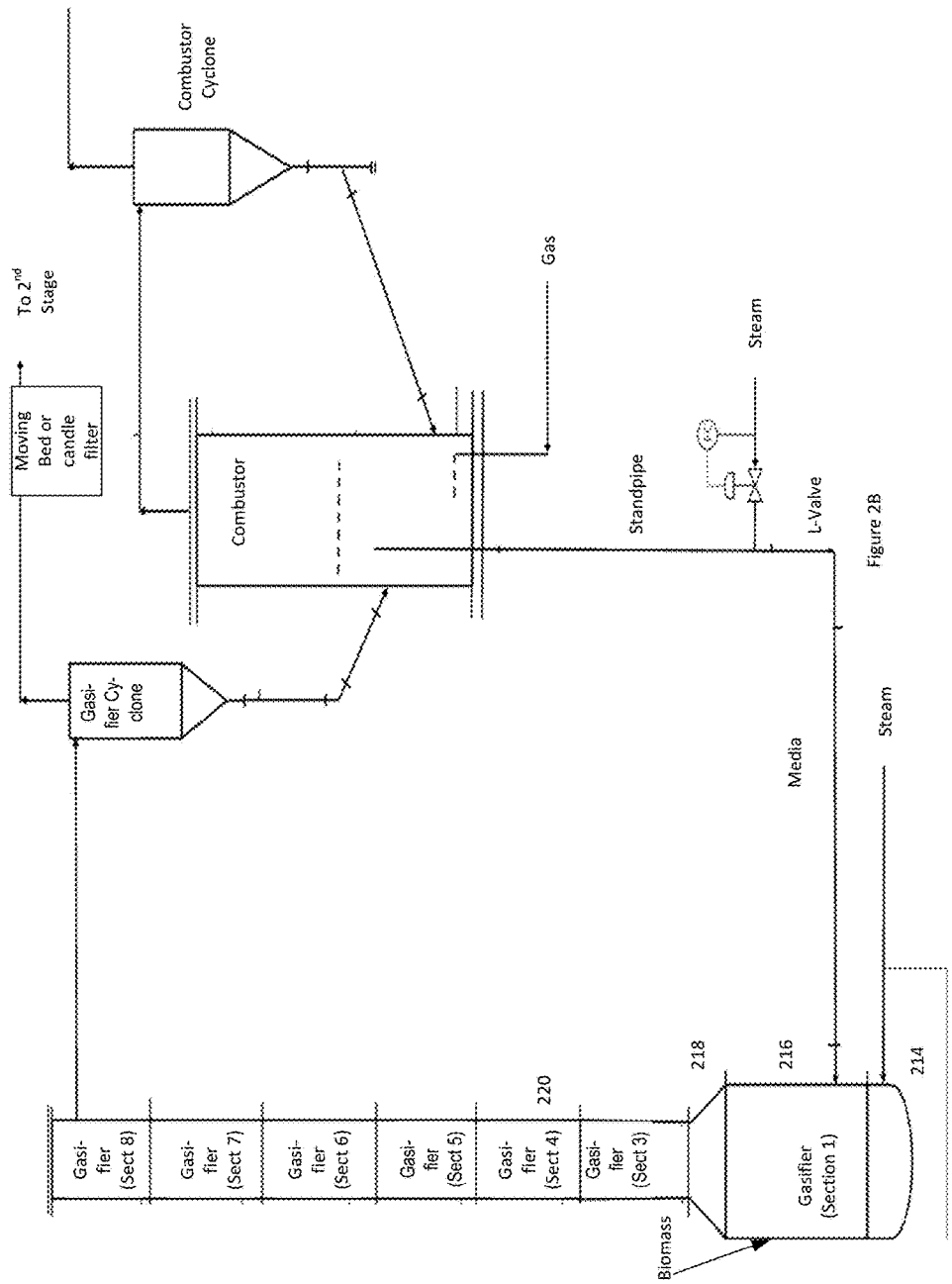
FIG. 2B illustrates a diagram of an embodiment of the first stage reactor including the circulating fluidized bed reactor coupled with a char combustor.

FIG. 2B illustrates a diagram of an embodiment of the first stage reactor including the circulating fluidized bed reactor coupled with a char combustor.

The circulating fluidized bed reactor has multiple sections forming a shape and an operation of the circulating fluidized bed reactor. The circulating fluidized bed reactor may have a bottom section 214 and a mixing pot section 216 of the vessel that are cylindrical in shape. The mixing pot section 216 then comes up to a necking portion 218 of the vessel that is smaller in diameter than the mixing pot section 216. The necking portion 218 then goes to a top riser section 220, which includes the reactor output of the first stage. In an embodiment, the cylindrical shaped bottom section 214 of the vessel to the necking portion 218 forms a mixing pot section 216 with circumference and/or width dimensions that are substantially greater than the circumference of the riser section 220. The bottom section 214 has the sparger to distribute high-temperature and high-pressure steam in the circulating fluidized bed reactor. The sparger is located at or near the bottom of the vessel. The high-temperature and high-pressure steam from the sparger may supply some of the energy needed to decompose the biomass as well as create an upward force to carry the biomass and circulating heat-absorbing media up through the vessel.

In an embodiment, the sparger cooperates with an associated bubble breaker, such as cross hatched metal, to make smaller bubbles of gas to better carry the solids of the circulating media and biomass upward. The bubble breakers also prevent slugging and provide smoother circulation.

The one or more supply inputs feed the biomass supply biomass chunks and/or particles at a higher pressure than in the vessel in order to distribute the biomass downward and across the vessel. The higher injection pressure and gravity cause the biomass chunks to be injected in the vessel. As a counter force, the steam from the sparger, superheated fluidization gases (steam, N2, Argon), and a stream of the heat absorbing media from the one or more stream inputs both gasify and push up falling chunks and particles of the biomass upward and in a radial direction in the vessel. The velocity of the steam, media, and gases as well as the pressure pushes up the falling chunks and particles of biomass upward into the circulating fluidized bed reactor vessel. Using the latent heat provided by the steam, media, and gases, the biomass is converted to syngas by a decomposition reaction with steam as the chunks or particles of biomass rise in the circulating fluidized bed gasifier. The high temperature and high-pressure of the steam and the heat absorbing media starts the devolatizing of the biomass, which causes localized turbulent flow of gases around each biomass chunk. The turbulent flow of gases creates better mixing and better reaction with the injected biomass.

The circulating fluidized bed may have different velocities flowing through the vessel, which also causes a good amount of turbulence for the biomass flowing with the circulating solid media. The velocity of the biomass flowing increases as the size of the chunk of biomass decreases via the decomposition of its larger complex molecules into smaller solid molecules and gaseous molecules. The devolatilization and decomposition of the biomass substantially increases the gas volume and therefore gas velocity of the system.

In an embodiment, the velocity flow of the biomass and/or heat absorbing media in the bottom section 216 is 2-3 feet/second. The velocity flow of the biomass and/or heat absorbing media in the mixing pot section 216 is between 2-6 feet/second in the circulating fluidized bed reactor based on a shape and dimensions of the vessel. The velocity flow of the biomass and its devolatilized gases and solids at a start of the necking transition section is up to 5-10 feet per second based on the shape and dimensions of the vessel in this section. The velocity flow of the biomass and its devolatilized gases and solids at the start of the necking transition section may be, for example, 6 feet per second. The velocity flow of the biomass and its devolatilized gases and solids within the riser section 220 speeds up to 10-20 feet per second. The velocity flow of the biomass and its devolatilized gases and solids at an exit of the riser section 220 is greater than 15 feet per second, and typically 20 feet per second, based on the shape and dimensions of the vessel in this section.

The velocity flows in the riser section 220 have a residence time of 1-2 seconds do to a rate of the velocity flow of the biomass and its devolatilized gases and solids, and the heat absorbing media; and, the designed dimensions and shape of the riser section 220. The lower velocities and bigger volume of the mixing pot section 216 allow for an on average residence time of 2-3 seconds within the mixing pot section 216 do to a rate of the velocity flow of the biomass and its devolatilized gases and solids, and the heat absorbing media; and, the designed dimensions and shape of the mixing pot section 216. This residence time is significantly longer than prior techniques. The longer residence time creates better mixing of the chunks of biomass with the circulating media to chemically react and decompose the biomass into its constituent solids and gases. Additionally, some chemical reactions need a longer chemical reaction time to assist in the prevention of forming of certain tars. Also, the longer residence time assists in increasing the yield of fully converting the woody biomass into its constituent solids, such as C (ash), and gases such as CO, CO2, CH4, and H2.

The angular necking section 218 of the circulating fluidized bed reactor reflects and turns some of the heat absorbing media, gases, and not fully-decomposed solid biomass on outside edges of the necking section 218 back down into the circulating fluidized bed in the mixing pot section 216, which causes more turbulence as well as a better distribution of the biomass inside the vessel. Note, an angle of the necking section 218 from the mixing pot section 216 to the riser section 220 controls an amount of turbulence with the reflected back heat absorbing media, gases, and not fully decomposed solid biomass into the mixing pot section 216 portion of the vessel. The more turbulence the better the mixing of the heat absorbing media and biomass, as well as a better distribution of the biomass throughout all of the circulating media in the lower portions of the circulating fluidized bed reactor vessel. The ratio of circulating media to biomass feed will be, for example, on the order of 20:1 up to 60:1 depending on operating objectives (desired reaction temperature, product slate, type and moisture content of biomass, temperature of incoming sand or olivine, etc.).

Note, example different shapes and angles of the vessel of the reactor are shown in FIGS. 2 and 3. The shown shapes and angles of the CFB reactor in FIGS. 2 and 3 are examples of the types of shapes and angles associated with portions of the vessel.

As discussed, the circulating fluidized bed reformer may have lower velocities at the bottom section 214 of the reactor, near the feed inlet, provided primarily by steam (and perhaps supplemental recycled syngas or CO2) and will quickly rise as the woody biomass reacts and/or changes are made to the reactor diameter. The circulating fluidized bed reformer also may or may not contain internals intended to help with smoother fluidization and better mixing of the incoming sand or olivine and biomass. In an embodiment, an internal portion of the vessel does have the one or more internal mixing baffles to assist with mixing of the heat absorbing media and biomass. Note, in the bubbling fluid bed version of the combustor internal mixing baffles may also be used.

As discussed, the circulating fluidized bed reactor has multiple sections forming a shape and an operation of the circulating fluidized bed reactor. The circulating fluidized bed gasifier has the sparger to distribute high-temperature and high-pressure steam in a bottom section 214 of the circulating fluidized bed reactor. The circulating fluidized bed reactor is configured to operate in a temperature regime from 750 degrees C. to 1000 C and an operating pressure is configured to be from 20 pounds per square inch up to 300 pounds per square inch with a typical value of 125 pounds per square inch. The steam and heated heat absorbing media create this operating temperature in the vessel, which can also be supplemented with an external heat source such as a gas-fired burner coupled to the vessel. The reason for the ranges of the operating conditions for the circulating fluidized bed reactor are biomass type, ash fusion temperature, yield patterns, and downstream performance requirements.

In another example embodiment, the superficial gas velocities in a top riser section 220 are configured to be greater than 19 feet/second based on a shape and dimensions in this section of the vessel while the velocities in a mixing pot section 216 will range from 2-6 feet/second based on a shape and dimensions in this section of the vessel. The mixing pot section 216 is located between the bottom section 214 and top riser section 220. The steam from any of 1) the sparger, 2) the stream inputs for the heat absorbing media, and 3) the supply inputs for the biomass combine to reform the biomass at total steam to biomass ratio ranging from 0.25:1 up to 1:1. The actual value will depend upon the biomass, its moisture content and operating objectives (yields, etc.). The steam and hot solid media reform the biomass in the circulating fluidized bed gasifier.

In the riser section 220, raw syngas including tars and methane, unreacted portions of solid biomass, ash from reacted portions of the biomass, and circulating media exit the riser section 220 of the circulating fluidized bed reactor.

The primary cyclone is coupled to the reactor output from the first stage in a riser section 220 of the circulating fluidized bed reactor. The top necking portion 218 of the circulating fluidized bed feeds into a top riser section 220 that then feeds into a primary cyclone that is very efficient, 99.99% efficiency at removing solid particles and pieces from the syngas. The primary cyclone is heavily loaded to operate at very high solids recovery efficiency in excess of 99%, and in most cases greater than 99.9%. In an embodiment, the cyclone has an efficiency 99.995%. The primary cyclone that is very efficient in separating solid particles including char and the solid circulating heat absorbing media routes the solid particles toward the char combustor. The primary cyclone also routes gases from the stream of the reaction products toward the input of the second stage of the bio-reforming reactor. Thus, the output of the top portion of the primary cyclone is raw syngas that is fed to the second stage. The output of the bottom portion of the primary cyclone is solid particles and pieces fed to the char combustor. Gravity pulls the solid particles and pieces, including heat absorbing media, ash, char, and other solids, down from the bottom of the primary cyclone through a loop seal into the char combustor.

Note, the char of the biomass, ash, and media (sand or olivine) stream is fed to the bubbling fluidized bed char combustor in order to regenerate and reheat the fluidization media.

Note, another type of combustor such as a circulating fluidized bed char combustor may be used. Also, another type of reactor may be used in the first stage such as a bubbling fluidized bed reactor, a radiant thermal reactor, a circulating fluidized bed reformer with a straight riser, or a fast-fluidized bed with a riser on top. Note, in an embodiment olivine is used as at least a portion of the heat absorbing media. The olivine material (specifically the Magnesium Oxide (MgO) in olivine) as heat absorbing media is for beneficial binding potassium out of the reaction products and minimizing clinker formation.

Note, tail/waste gases from other parts of the integrated plant, including methane from a downstream methanol stage if used, may be routed in a loop to the char combustor and used as supplemental fuel in the combustor to heat the heat absorbing media. The char and fuel gases are combusted to heat the heat absorbing media. Natural gas may be used as supplemental fuel in the combustor to provide the balance of gasification heat required. The combustor is operated at gas velocities that allow the smaller/lighter ash particles to be separated from the sand or olivine, and recovered in flue gas solids removal systems (downstream of the recycle combustor cyclone). Hot, regenerated sand or olivine is returned to the gasifier/circulating fluidized bed reactor via an L-valve.

In an embodiment of the circulating fluidized bed version of the combustor, a recycle cyclone is coupled to the char combustor and is configured to operate at less than maximal efficiency from as low as 75% and no higher than 99%. This is to ensure that a bulk of the heat absorbing media is returned to the char combustor but will allow the lighter ash particles to escape to the recycle cyclone where the ash particles are removed from the integrated plant. The recycle cyclone is the primary mode of exit for ash from the system (as well as attrited fines from the circulating media). The cyclone separator is a low efficiency cyclone separator that separates two solids such as the heavier circulation medium, such as sand or olivine, from the lighter particles of ash. In an embodiment of the bubbling fluidized bed version of the combustor, the cyclone will be extremely high efficiency—greater than 99.99%.

For the circulating fluid media loop with stage 1 of the BRR and the char combustor, the design may use properly designed devices such as L-valves and loop seals to ensure a desired circulation rate with safe operation.

The heat absorbing circulating media could be silica-based sand, olivine, ilmenite, or mixtures thereof. The integrated plant may also put in other additives with the circulating media such as catalysts (to reduce the tar and other heavy hydrocarbon yield, increase approach to water-gas shift equilibrium, sulfur getters, and other additives to raise the melting points of the ash and media).

Figure 3B:
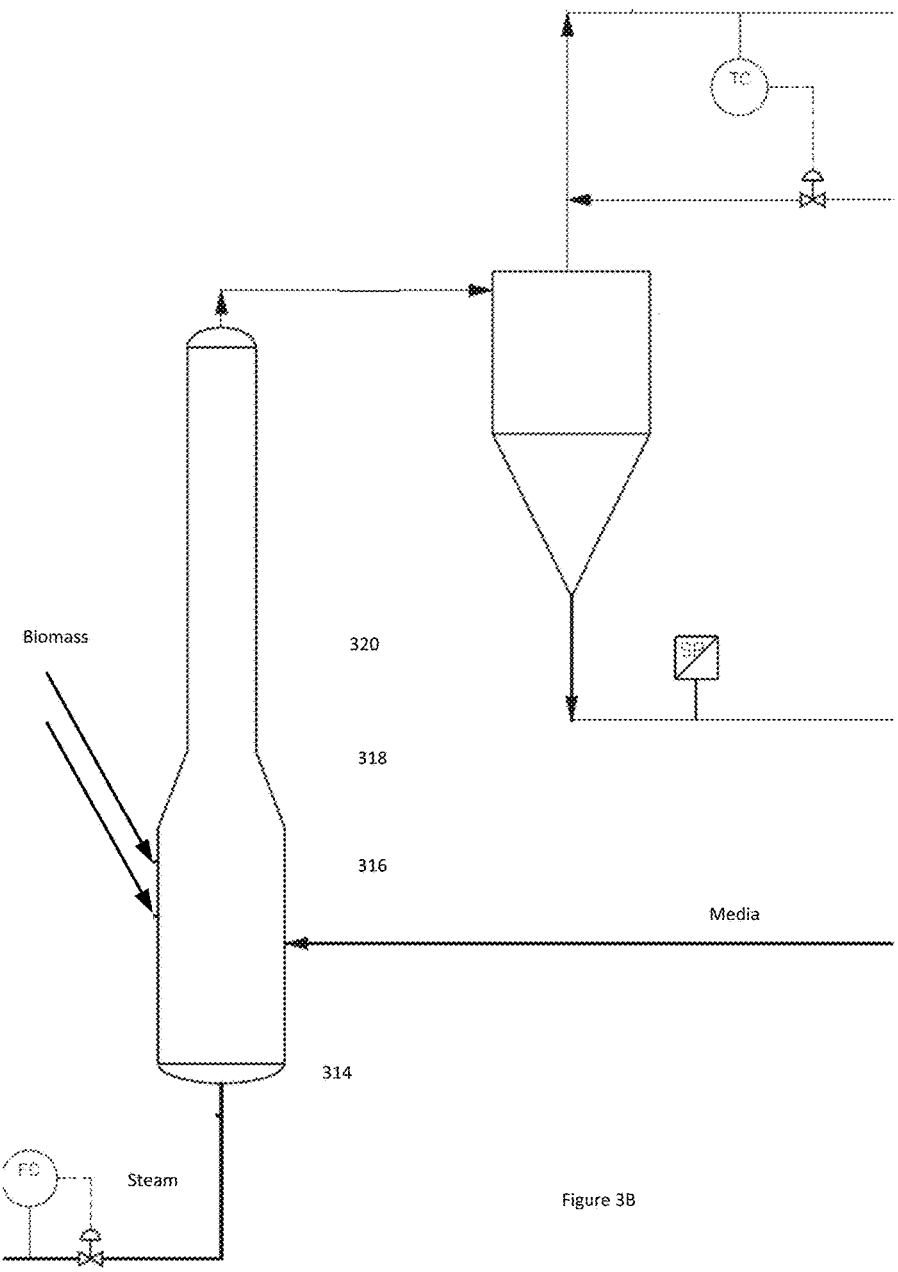
FIG. 3B illustrates a diagram of an embodiment of the circulating fluidized bed reactor having multiple sections that form a shape and an operation of the circulating fluidized bed reactor.

FIG. 3B illustrates a diagram of an embodiment of the circulating fluidized bed reactor having multiple sections that form a shape and an operation of the circulating fluidized bed reactor.

The circulating fluidized bed reactor has multiple sections 314-320 forming a shape and an operation of the circulating fluidized bed reactor. The circulating fluidized bed reactor may have a bottom section 314 and a mixing pot section 316 of the vessel that are cylindrical in shape. The mixing pot section 316 then comes up to a necking portion 318 of the vessel that is smaller in diameter than the mixing pot section 316. The necking portion 318 then goes to a top riser section 320, which includes the reactor output of the first stage, of the circulating fluidized bed reactor. The bottom section 314 has the sparger to distribute high-temperature and high-pressure steam in the circulating fluidized bed reactor. The sparger supplying steam is located at or near the bottom section 314 of the vessel.

The bottom section 314 of the vessel and the mixing pot section 316 of the vessel have width dimensions that are substantially greater than a circumference of the riser section 320. The circulating fluidized bed has different velocities flowing through the vessel in the multiple sections, which causes turbulence for the biomass flowing with the circulating solid media. The sparger at the section 314 of the vessel injects high-pressure steam at a velocity of about 2 feet/second and the high-pressure steam is between 50 to 300 pounds per square inch.

The supply inputs to feed biomass are located in the mixing pot section 316 to feed the biomass toward the bottom of the vessel, where the biomass is mixed with superheated fluidization gases and heat absorbing media. The feed point of the supply inputs to feed biomass is far enough from the bottom section 314 of the vessel to ensure the biomass readily falls from the supply inputs into the vessel from a great enough height that the biomass cannot get close to physically building up from the bottom to block the entering biomass; and thus, a location of the feed point of the supply inputs in the vessel eliminates a need to have a seal in the supply inputs against solid biomass back flow. The design may have at least 3 foot drop on the gas feed line to taps/aeration points and also the gasifier/reactor and the char combustor plenums. This 3 foot rise is a very effective seal against solid back flow. This drop and rise varies with specific size and geometry of vessel.

The circulating fluidized bed reactor/biomass gasifier may be lined with refractory materials of both soft and hard refractory materials such as 2 inches of soft refractory insulation and 2 inches of hard refractory insulation. In an embodiment, the thickness of the hard face refractory insulation is adjusted to fit into nominal pipe and vessel size requirements. In another embodiment, what governs the refractory thickness and fit is the need to control temperature of the chosen metallurgy, erosion and chemical resistance of the refractory, etc.

Figure 4B:
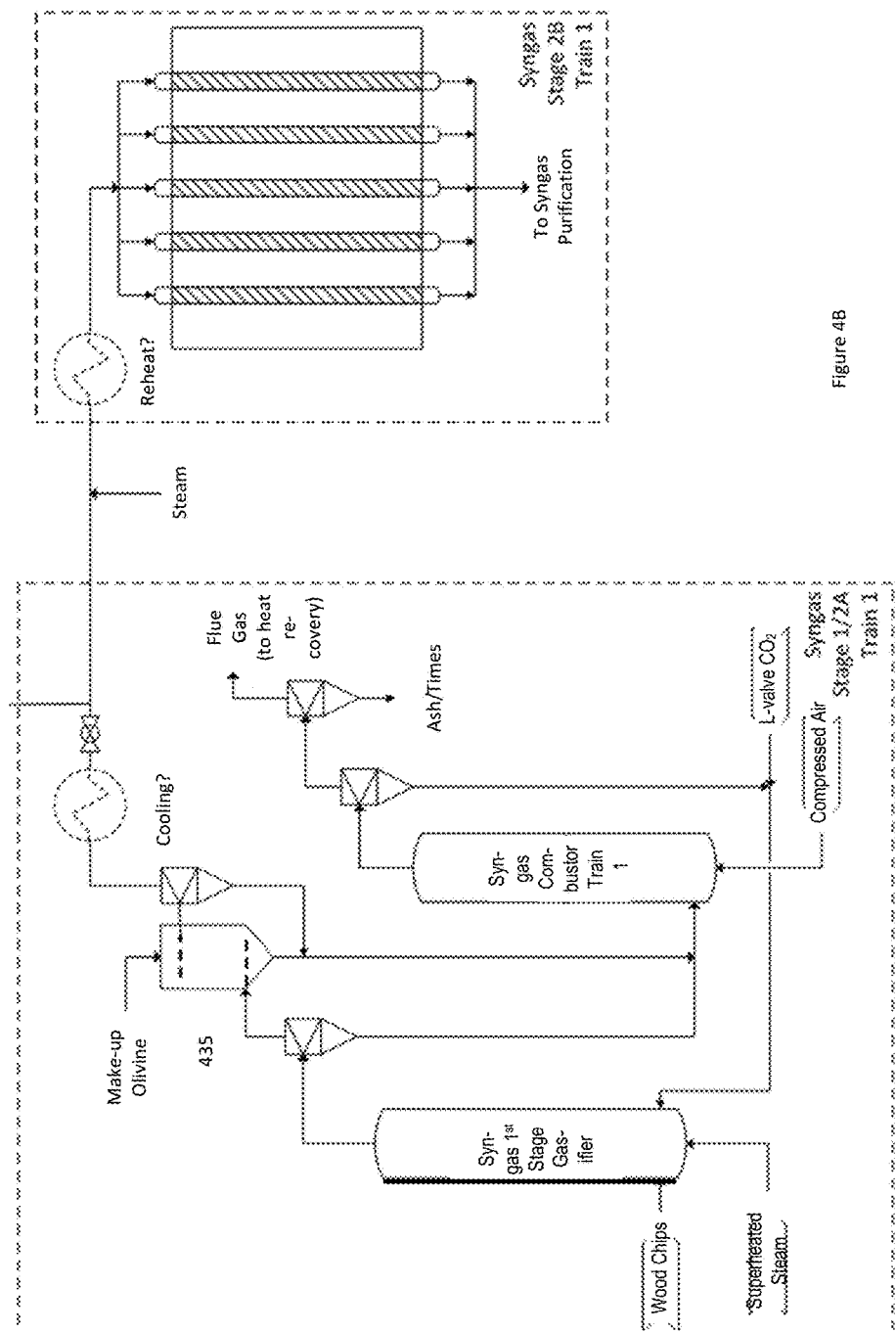
FIG. 4B illustrates a diagram of an embodiment of a densely packed moving bed coupled to the reactor in the first stage via the primary cyclone.

FIG. 4B illustrates a diagram of an embodiment of a densely packed moving bed coupled to the reactor in the first stage via the primary cyclone.

The densely packed moving bed 435 may be made of olivine, ilmenite, or dolomite that is similar in composition to circulating heat absorbing media. The densely packed moving bed 435 is configured to act as both a dust filter and a tar destroyer from the raw syngas stream coming out from the reactor output of the first stage. The densely packed moving bed 435 is coupled to a gaseous output of the primary cyclone coupled to the reactor output of the first stage. The tar destruction bed could operate adiabatically at 900 C (temperature could drop to 800-850 C) or isothermally with a mechanism for heating the bed—e.g. via a furnace or some oxygen addition. In an embodiment, the moving bed 435 is configured to operate adiabatically at 800 C to 950 C temperature. Tars heavier than benzene are chemically broken down into constituent gases in the raw syngas in the densely packed moving bed 435 in order to protect any downstream components from coating with soot.

In general, olivine is active for tar conversion at the decomposition and decomposition conditions present. Olivine is generally used in the gasifier as heat absorbing media, due to its attrition resistance; however, it can also be applied separately downstream of the gasifier in the moving packed bed form as a guard bed/tar converter. Olivine performance for tar cracking activities can be very effective at these conditions. Regeneration of the Olivine packed moving bed 435 is accomplished by flowing the moving packed bed of Olivine with its collected dust and heavy tar residue into the packed bed of olivine and then into the char combustor to be joined and heated with the rest of the circulating olivine in the char combustor. In an embodiment, conversions—tars (heavier than benzene) may be 25-65%; benzene conversion may be 90%; light hydrocarbons conversion may be 0%; and methane conversion in the raw syngas may be 0%. Thus, the hot packed slow moving bed 435 of olivine is operated at about 900 degrees C. to chemically break down the heavy sooting tars, such as polyaromatic hydrocarbons tars, in the raw syngas from the gasifier/reactor in the first stage. The hot packed slow moving bed 435 of olivine, acts as a tar pre-reformer to substantially breaks down the heavy sooting tars to protect the downstream components from coating with soot.

Note, in order not to fluidize the moving bed, the apparent weight of the bed must exceed the pressure drop through the bed. Using an average olivine particle diameter of 550 microns, a GHSV (active bed length) of 3,000 v/v/hr, and an L/D of 0.385 ft/ft, a pressure drop of 4.1 pounds per square inch is estimated. Therefore, in an embodiment, a minimum densely packed bed level of seven feet (ft) is required above the outlet gas collector in order to keep the densely packed moving bed 435 from fluidizing.

In an embodiment, the moving bed may draw circulating media from the char combustor to act as the feed source for the densely packed bed and could be fed by a loop to the make-up insertion input into the moving bed.

In an embodiment, once the syngas has been processed to remove a substantial amount of heavy tars in the integrated plant, and then the syngas will be sent to the stage 2 system for destruction of the remaining tars and conversion of a substantial amount of the methane to synthesis gas in a catalytic reactor. This catalytic reactor may be packed with supported metal catalysts active for methane reforming and tar destruction. Typical metal catalysts include nickel oxide, precious metals, etc. as catalysts. In an embodiment, the catalytic reactor in the second stage may operate at 850-900 C and have multiple tubes, each with the catalyst inside the vessel of the reactor while gas fired heaters supply heat for the chemical reactions inside the tubes. The reactor may be co-fed with sufficient superheated steam to increase the steam:carbon ratio of the catalytic reactor feed to, for example, 8 mol/mol. The syngas with light tars and methane enters the tubes with the catalyst and then this reforms the light hydrocarbons in their constituent molecules of H2, CO, CO2, etc.

The catalytic reactor in the second stage may operate at GHSV's ranging from 1000-20,000 inverse hours, most preferably in the 2,000-7,000 range. The temperature of operation would be 700-1000 C, most likely in the 800-900 C range. The exact operating conditions would be a function of desired conversion, feed properties, and catalyst life. The tubular reactor system is installed in a fired furnace not unlike a Steam Methane Reformer furnace or ethylene furnace. The catalyst will require regeneration on some frequency to maintain activity. The regeneration is effected by mild oxidation of the carbon deposited on the catalyst, although steam or hydrogen regeneration in a reducing atmosphere can also be practiced.

The second stage of the BRR reduces the tars by cracking the tars out of the gas stream and does use a catalyst. The second stage reduces the methane percentage by steam-reforming the methane into smaller molecules such as CO, CO2, and H2. The resultant chemical grade synthesis gas will be substantially tar-free (less than 100 ppm total tars including benzene and naphthalene and more likely less than 5 ppm) with methane content as low as 2% (dry basis) and certainly no higher than 10%.

The output of the second stage is sent to a syngas cleanup section to remove additional trace contaminants from the syngas, such as sulfur, water, and potassium, and other trace contaminants before sending the chemical grade syngas to downstream chemical processes, selected from a methanol synthesis reactor, a Methanol to Gasoline reactor train process, a low temperature Fischer-Tropsch reactor train, or another chemical process that uses the reaction syngas product derived from biomass in the bio-reforming reactor.

In an embodiment, a tubular reactor with an operating temperature over 1100 degrees C. can substantially crack all of the tars and methane without a catalyst. A tubular reactor with lower operating temperatures can also crack these molecules with the assist of a catalyst.

As part of the plant integration, some of the raw syngas may bypass the Stage 2 catalytic reformer so as to maintain a high calorific value as use for fuel gas in the rest of the plant. This will especially be true for those cases requiring higher greenhouse gas reduction or for those where natural gas is not readily available at reasonable cost. This fuel gas could be used for generating steam, firing furnaces, supplemental fuel to the char combustor, and other places where natural gas might typically be used. Also, beneficial carbon credits may be generated for using this raw syngas from the integrated plant over natural gas.

Referring back to FIG. 1B, the integrated plant may have a biomass feed supply system, an interconnected set of two or more stages of reactors 101, 103 to form a bio-reforming reactor, a gas clean up section, a steam methane reformer in parallel with bio-reforming reactor, and any of a methanol synthesis reactor, a Methanol to Gasoline reactor train process, a high temperature Fischer-Tropsch reactor train, or another chemical process that uses the reaction syngas product derived from the decomposition in the bio-reforming reactor and syngas from the steam methane reformer.

In the biomass feed supply system, the biomass may be stored as chips. The conveyor may bring the chips of biomass over to a filter/screen that make sure that the chip size is within limits, such as underneath 2 inches of length of chip of biomass. After the screening of the chip size, the biomass chips may be fed to a size reduction step such as a Hammermill. The Hammermill may then feed the chips to second screen to make sure that the chip size is within limits, such as underneath ¾ inches of length of chip of biomass. A conveyor may bring the chips through the second screen to either 1) a chip dryer or 2) to a biomass pre-treatment process to make small fine particles of biomass, such as a steam explosion process. Chips going to the biomass pre-treatment process such as a steam explosion process are turned into fine moist particles of biomass magnitudes smaller in size than the chips. The moist fine moist particles of biomass go to a dryer system and become biomass in a dried powered form. The dried powdered form of biomass may be stored in a silo. The biomass may be stored as chips.

The moisture content of the biomass can range from say 3-5% to as high as 35%. The integrated plant may have drying options that can include flash dryers, rotary drum dryers, or belt dryers. The integrated plant may dry in a low oxygen atmosphere for safety reasons including prevention of fires as well as inert gases from other parts of the process can be re-used and integrated as a supply into the dryers.

The biomass maybe fed to a lock hopper, where an entrainment feed gas system feeds the dried biomass into a circulating fluidized bed bioreactor. Alternatively, the chips of biomass in their slightly wet form also may go through a biomass chip dryer system and then be stored as half-inch to three-quarter inch chips of biomass in a silo tank. The chips of biomass are then fed through a conveyor to a chip lock hopper and feed system into the circulating fluidized bed bio reformer in the first stage 101.

The circulating fluidized bed bio reformer produces the raw syngas and other reaction products sent to the cyclone and moving bed in the outlet of the first stage 101. The gases from the first cyclone may be fed to one of three pathways. The first potential pathway is through a catalytic reactor second stage system 103. The second potential pathway is through a thermal reactor second stage system 103. The thermal second stage system that operates a higher temperature may be a radiant heat reactor. The pathway through the thermal reactor does not need to use a catalyst but rather operates at a higher temperature.

In any of the possible stage 2 reactors, the second stage reduces the methane percentage by steam-reforming the methane into smaller molecules such as CO, CO2, and H2. The second stage of the BRR reduces the tars by cracking the light tars and virtually all of the heavy tars out of the chemical grade syngas stream. The chemical grade syngas stream from the second stage is sent to a syngas cleanup section to remove additional contaminants from the syngas, such as sulfur, water, and potassium, and other contaminants before sending the chemical grade syngas to downstream chemical processes.

The integrated plant includes the multiple stage bio-reforming reactor that generates a chemical grade syngas that is supplied to a transportation fuel back-end such as gasoline or high temperature Fischer Tropsch fuel products. The integrated plant receives raw biomass such as pine wood and converts the biomass into the transportation fuel. The integrated plant may use diverse biomass feedstocks and feedstock preparation methods (including chip size and powder size). The integrated plant may have a flexible configuration to feed reaction products (of both natural gas and biomass, or biomass only fed into the bio-reforming reactor) to meet regional requirements and to maximize economics.

In an embodiment, the two or more stages, such as the 1st stage and 2nd stage, forming the bio-reforming reactor converts the solid biomass from the chunk or particle preparation step into gaseous reactants including CH4, H2, CO2, & CO. The syngas produced by the bio-reforming reactor can be low in carbon dioxide because by design a substantially stoichiometric amount of steam is supplied into the reactor and no additional oxygen is supplied as a reactant or fuel to drive the reaction in the decomposition reaction. Thus, a very low amount of oxygen is present and the decomposition reaction produces mainly CO rather than CO2. The syngas from the biomass reforming reactor is also low in nitrogen, low in ammonia, low in sulfur content, and low in hydrogen cyanide (HCN). For example, the sulfur content of the syngas gas coming out of the bio-reforming reactor is barely over one part per million after the clean-up steps. In an embodiment, right out of the bio reforming reactor itself, the syngas stream could contain sulfur as high as 50 ppm; and the same is true for other constituents such as HCN, NH3, etc. The woodchips used to produce the particles of biomass generally have a low sulfur content. Barely trace amounts of HCN, ammonia, are generated and trace amounts of nitrogen are present making the syngas virtually free of nitrogen, ammonia, and HCN, in the syngas stream coming out of the bio-reforming reactor. In contrast, syngas from coal contains high quantities of sulfur, amine, and HCN. Accordingly, the syngas cleanup components downstream of the bio-reforming reactor can be less inclusive and exclude some of the gas cleanup components needed for other biomass syngas producers, such as a coal-based syngas. Thus, compared to a coal-based syngas, an ammonia removal plant is not needed, a HCN removal plant is not needed, a nitrogen purge is not needed, and merely either the bulk sulfur removal or a sulfur guard bed is needed but not both. The lack of having to put multiple contaminant removal steps into the gas cleanup portion of the integrated plant reduces both capital expenses for constructing and installing in that equipment as well as reducing operating expenses for having to operate the additional gas removal equipment and replace their catalysts/filters to remove the contaminants from the syngas stream.

The syngas stream from the decomposition coming out of the bio-reforming reactor may have a 1.1:1 or a 1.2:1 hydrogen to carbon monoxide ratio. A ratio controller with sensors located at the input of the high temperature Fischer-Tropsch train will control the hydrogen to carbon monoxide ratio of syngas going into the Fischer-Tropsch train. The ratio will be about 1.5:1 to 2.0:1 hydrogen to carbon monoxide controlled by the controller and measured by hydrogen and carbon monoxide sensors at that input. In an embodiment, H2:CO ratios of 1.8:1 to as high as 2.1:1 are in the syngas stream because of the steam in the process and the amount of water gas shift that goes on. The downside is that too much CO2 may be made for the Fischer-Tropsch train and some CO2 removal may be inline or an additive may be added in the reactor process itself. However, the syngas to Methanol (MEOH) train does not mind CO2 since it is a chemical reactant in this process. Sensors can also be located at the output of the bio-reforming reactor as well as the steam methane reforming reactor to have a ratio control system to know what the molarity of the syngas being supplied by each of these reactors is in order to know the proper volumes to mix to get the end result of having a combined syngas from the steam methane reforming reactor and the bio-reforming reactor between, for example, the range of 1.5:1 and 2.0:1. The ratio control system will also send feedback to both the bio-reforming reactor and the steam methane reforming reactor in order to control the volume of syngas being produced by both of those reactors.

While the foregoing design and embodiments thereof have been provided in considerable detail, it is not the intention of the applicant(s) for the design and embodiments provided herein to be limiting. Additional adaptations and/or modifications are possible, and, in broader aspects, these adaptations and/or modifications are also encompassed. Accordingly, departures may be made from the foregoing design and embodiments without departing from the scope afforded by the following claims, which scope is only limited by the claims when appropriately construed.

What is claimed is:

1. An integrated plant, comprising:
an interconnected set of two or more stages of chemical reactors to form a bio-reforming reactor that is configured to receive biomass in order to generate chemical grade syngas for a coupled downstream train of any of 1) a methanol-synthesis-reactor train, 2) a methanol-to-gasoline reactor train, and 3) a high-temperature Fischer-Tropsch reactor train, that use this syngas derived from the biomass in the bio-reforming reactor, where a renewable carbon content of gasoline, jet fuel, and/or diesel derived from the coupled downstream trains of any of 1) the methanol-synthesis-reactor train, 2) the methanol-to-gasoline reactor train, or 3) the high-temperature Fischer-Tropsch reactor train are optimized for recovery of renewable carbon content to produce any of 1) fuel products with 100% biogenic carbon content, 2) fuel products with 50-100% biogenic carbon, and 3) any combination of fuel products with solely 100% biogenic carbon content as well as fuel products with 50-100% biogenic carbon content;
a biomass feed system;
a first stage of the bio-reforming reactor includes a circulating fluidized bed reactor that has one or more stream inputs to feed heat absorbing media, including silica sand, ilmenite, olivine, dolomite, zeolite catalysts and any combination of the five, a vessel to circulate the heat absorbing media, one or more feed supply inputs to feed biomass from the biomass feed system to the circulating fluidized bed reactor, and a sparger to input steam at or near a bottom of the circulating fluidized bed reactor, where the circulating fluidized bed reactor of the first stage is configured to cause chemical reactions of the biomass into its reaction products of constituent gases, tars, chars, and other components, which exit through an output from the circulating fluidized bed of the first stage,
a tubular chemical reactor of a second stage of the bio-reforming reactor that has an input configured to receive a stream of some of the reaction products from the output from the circulating fluidized bed via a cyclone that includes the constituent gases and then chemically reacts the raw syngas within the tubular chemical reactor of the second stage to make the raw syngas from the first stage into the chemical grade syngas by further processing including cracking and/or reforming the 1) tars, 2) light hydrocarbons ($C_1$-$C_4$), or 3) both into their constituent molecules so that a resultant chemical grade syngas stream going out a reactor output of the tubular chemical reactor can be used as a chemical feedstock in other chemical reactions in the above coupled downstream trains of the integrated plant rather than just being a source of a fuel gas for other components, and
one or more feedback loops connect to at least the tubular chemical reactor of the second stage include a carbon-dioxide gas feedback loop that cooperates with a $CO_2$ separation unit to supply a fraction of the $CO_2$ gas that is removed from the chemical grade syngas produced from the reactor output of the tubular chemical reactor of the second stage to supply extracted $CO_2$ gas to the biomass feed system, where the $CO_2$ gas is supplied to at least biomass dryers to dry and be motive gas for the biomass, where the biomass is subsequently supplied to the one or more feed supply inputs of the circulating fluidized bed reactor.

2. The integrated plant of claim 1,
where the methanol-synthesis-reactor train to couple downstream of the CO2 separation unit and a syngas compression unit to receive the chemical grade syngas as a chemical feedstock to generate methanol from the chemical grade syngas derived from the biomass, and
where the tubular chemical reactor of the second stage of bio reforming reactor has one or more inputs configured to receive chemical feedstock from two sources, i) the raw syngas from the output of the reactor of the first stage, and ii) purge gas from the methanol-synthesis-reactor train that is recycled back to the tubular chemical reactor of the bio reforming reactor to recover hydrogen and carbon-based purge gases to be converted into the chemical grade syngas produced by the reactor output of the tubular chemical reactor of the second stage.

3. The integrated plant of claim 1, where the second stage includes heaters for the tubular chemical reactor of the second stage to maintain an operating temperature of that reactor of at least 700 degree C., where a fuel gas mixing and distribution component is configured to receive fuel gas from a number of sources including a tail gas from a hydrogen pressure swing absorber from the downstream methanol-synthesis-reactor train that takes in the chemical grade syngas as a chemical feedstock to generate methanol and a purge gas from the downstream methanol-to-gasoline train that takes in the methanol as a chemical feedstock, where the fuel gas mixing and distribution component distributes that fuel gas via a fuel gas feedback loop of hydrogen and/or carbon-based gases that connect to the heaters for the tubes of the tubular chemical reactor in order to crack the tars and reform the light hydrocarbons (C1-C4).

4. The integrated plant of claim 1, further including:
a hydrogen recirculation feedback loop configured to recover hydrogen gas from purge gas from the downstream methanol-synthesis-reactor train to be combined with the chemical grade syngas supplied from the tubular chemical reactor to control a methanol feed modulus ratio for a hydrogen to carbon monoxide ratio needed for methanol synthesis, and
where the downstream methanol-synthesis-reactor train is configured to take in the chemical grade syngas as a chemical feedstock to generate methanol, where a hydrogen pressure swing absorber is configured to separate out the hydrogen gas from the purge gas from the methanol-synthesis-reactor train in order to recover the hydrogen gas from the purge gas, where any subsequent gasoline, diesel or jet fuel produced from the generated methanol in the methanol-to-gasoline reactor train or the high-temperature Fischer-Tropsch reactor train has a biogenic content of 100%.

5. The integrated plant of claim 4, further including:
where the biomass feed system to supply wood chips as the biomass through the one or more feed supply inputs, and
where the hydrogen pressure swing absorber is configured to connect to the hydrogen recirculation feedback loop, where the hydrogen pressure swing absorber is configured to receive the purge gas from the downstream methanol-synthesis-reactor train and extract hydrogen gas, and then is configured to also supply extracted hydrogen to the methanol-to-gasoline reactor train to change any ratios of produced gasoline to get a desired octane rating needed for commercial gasoline, where the methanol-to-gasoline reactor train receives its methanol from the methanol-synthesis-reactor train, where the gasoline produced from the chemical grade syngas derived from the wood chips is 100% biogenic.

6. The integrated plant of claim 1, where the biomass feed system is configured to supply wood chips as the biomass through the one or more feed supply inputs, and wherein the $CO_2$ separation unit is configured to connect to a carbon dioxide compressor to pressurize the $CO_2$ gas, where the carbon dioxide compressor connects to both i) lock-hoppers connecting to the one or more feed supply inputs of the first stage and ii) the biomass dryers connecting to the lock hoppers in order for the chemical grade syngas produced from the reactor output of the tubular chemical reactor of the second stage to have a 100% percent bio genic rating, where the lock hoppers are configured to use the CO2 gas to pressurize the wood chips; and thus, move the wood chips to go across a pressure boundary into the circulating fluidized bed reactor of the first stage of the bio reforming reactor.

7. The integrated plant of claim 1, further comprising:
a steam methane reformer to generate a stream of exit gases selected from a group consisting of 1) hydrogen gas, 2) a hydrogen-rich syngas composition, in which a ratio of hydrogen-to-carbon monoxide is higher than a ratio generally needed for methanol synthesis, and 3) any combination of the two, to be mixed with a potentially carbon-monoxide-rich syngas composition, in which a ratio of carbon monoxide to hydrogen is higher than the ratio generally needed for methanol synthesis from the chemical grade syngas produced by the second stage, where a hydrogen pressure swing absorber is configured to separate out the hydrogen gas from the purge gas from the methanol-synthesis-reactor train, and a syngas combiner and compression unit configured to receive chemical feedstock gas from all three of i) the chemical grade syngas produced by the second stage, ii) the exit gases from the steam methane reformer, and iii) the hydrogen from the hydrogen pressure swing absorber, to locally control a methanol feed modulus ratio for a hydrogen to carbon monoxide ratio needed for methanol synthesis, where the generated methanol has a biogenic content between 50%-100%.

8. The integrated plant of claim 7, further comprising:
a fuel gas mixing and distribution unit has a natural gas input to receive natural gas in addition to a purge gas input to receive purge gases from both a methanol-to-gasoline reactor train and the hydrogen pressure swing absorber connected to the methanol-synthesis-reactor train, where the fuel gas mixing and distribution unit is configured to receive natural gas to supplement any needs that it may need to supply the fuel gas needed to heat up different trains and components, where the fuel gas mixing and distribution components distributes the fuel gas to i) heaters in the second stage of the bio reform and reactor to drive the heaters to fire the tubes of the tubular chemical reactor to heat up that reactor, and ii) heaters of the steam methane reformer for its heaters, where any subsequent gasoline produced from the generated methanol in the methanol-to-gasoline reactor train has a biogenic content between 50% to 100%.

9. The integrated plant of claim 7, further including:
a natural gas conditioning unit, with a natural gas input as well as one or more purge gas inputs, where the natural gas conditioning unit is configured to receive purge gases from the hydrogen pressure swing absorber as well as purge gases from the methanol-to-gasoline reactor train, where these purge gas components are being used as a chemical feedstock to be mixed with another chemical feed stock of natural gas from the natural gas input, where an output from the natural gas conditioning unit supplies the mixed chemical feedstock into a chemical feed input for the steam methane reformer.

10. The integrated plant of claim 1, where the first stage further includes the circulating fluidized bed reactor coupled with a char combustor, where the char combustor is configured to heat and supply the circulating heat absorbing media to the one or more inputs into the circulating fluidized bed reactor, where a fuel gas mixing and distribution component receives fuel gas from a number of sources including i) a purge gas from a hydrogen pressure swing absorber from the downstream methanol-synthesis-reactor train that takes in the chemical grade syngas as a chemical feedstock to generate methanol, and ii) a purge gas from a downstream methanol-to-gas train that takes in the methanol as a chemical feedstock, where the fuel gas mixing and distribution component distributes that fuel gas via a fuel gas feedback loop of hydrogen and/or carbon-based gases that connects to the char combustor to supply fuel gas, where the methanol-to-gas train is configured to produce gasoline with a biogenic content of 100%.

11. The integrated plant of claim 1, where the first stage is configured to supply the raw syngas from the circulating fluidized bed reactor from the output from the circulating fluidized bed of the first stage to both i) the tubular chemical reactor of the second stage and ii) a fuel gas mixing and distribution unit to supply fuel gas to heaters of other plant components including the heaters of the second stage and heaters in the methanol-to-gasoline train.

12. A method for an integrated plant, comprising:
operating an interconnected set of two or more stages of chemical reactors to form a bio-reforming reactor that is configured to receive biomass in order to generate chemical grade syngas for a coupled downstream train of any of 1) a methanol-synthesis-reactor train, 2) a methanol-to-gasoline reactor train, and 3) a high-temperature Fischer-Tropsch reactor train, that use this syngas derived from the biomass in the bio-reforming reactor, where a renewable carbon content of gasoline, jet fuel, and/or diesel derived from the coupled downstream trains of any of 1) the methanol-synthesis-reactor train, 2) the methanol-to-gasoline reactor train, or 3) the high-temperature Fischer-Tropsch reactor train are optimized for recovery of renewable carbon content to produce any of 1) fuel products with 100% biogenic carbon content, 2) fuel products with 50-100% biogenic carbon, and 3) any combination of fuel products with solely 100% biogenic carbon content as well as fuel products with 50-100% biogenic carbon content;
operating a biomass feed system;
operating a first stage of the bio-reforming reactor includes a circulating fluidized bed reactor that has one or more stream inputs to feed heat absorbing media, including silica sand, ilmenite, olivine, dolomite, zeolite catalysts and any combination of the five, a vessel to circulate the heat absorbing media, one or more feed supply inputs to feed biomass from the biomass feed supply system to the circulating fluidized bed reactor, and a sparger to input steam at or near a bottom of the circulating fluidized bed reactor, where the circulating fluidized bed reactor of the first stage is configured to cause chemical reactions of the biomass into its reaction products of constituent gases, tars, chars, and other components, which exit through an output from the circulating fluidized bed of the first stage, operating a tubular chemical reactor of a second stage of the bio-reforming reactor that has an input configured to receive a stream of some of the reaction products from the output from the circulating fluidized bed via a cyclone that includes the constituent gases and then chemically reacts the raw syngas within the tubular chemical reactor of the second stage to make the raw syngas from the first stage into the chemical grade syngas by further processing including cracking and/or reforming the 1) tars, 2) light hydrocarbons ($C_1$-$C_4$), or 3) both into their constituent molecules so that a resultant chemical grade syngas stream going out a reactor output of the tubular chemical reactor can be used as a chemical feedstock in other chemical reactions in the above coupled downstream trains of the integrated plant rather than just being a source of a fuel gas for other components, and operating one or more feedback loops connected to at least the tubular chemical reactor of the second stage including a carbon-dioxide gas feedback loop that cooperates with a $CO_2$ separation unit to supply a fraction of the $CO_2$ gas that is removed from the chemical grade syngas produced from the reactor output of the tubular chemical reactor of the second stage to supply extracted $CO_2$ gas to the biomass feed system, where the $CO_2$ gas is supplied to at least biomass dryers to dry and be motive gas for the biomass, where the biomass is subsequently supplied to the one or more feed supply inputs of the circulating fluidized bed reactor.

13. The method for the integrated plant of claim 12, operating the methanol-synthesis-reactor train to couple downstream of the CO2 separation unit and a syngas compression unit in order to receive the chemical grade syngas as a chemical feedstock to generate methanol from the chemical grade syngas derived from the biomass, and operating the tubular chemical reactor of the second stage of bio reforming reactor to have one or more inputs to receive chemical feedstock from two sources, i) the raw syngas from the output of the reactor of the first stage, and ii) purge gas from the methanol-synthesis-reactor train that is recycled back to the tubular chemical reactor of the bio reforming reactor to recover hydrogen and carbon-based purge gases to be converted into the chemical grade syngas produced by the reactor output of the tubular chemical reactor of the second stage.

14. The method for the integrated plant of claim 12, further comprising:

operating the second stage with heaters for the tubular chemical reactor of the second stage to maintain an operating temperature of that reactor up to at least 700 degree C., where a fuel gas mixing and distribution component is configured to receive fuel gas from a number of sources including a purge gas from a hydrogen pressure swing absorber from the downstream methanol-synthesis-reactor train that takes in the chemical grade syngas as a chemical feedstock to generate methanol and a purge gas from the downstream methanol-to-gasoline train that takes in the methanol as a chemical feedstock, where the fuel gas mixing and distribution component distributes that fuel gas via a fuel gas feedback loop of hydrogen and/or carbon-based gases that connect to the heaters for the tubes of the tubular chemical reactor in order to crack the tars and reform the light hydrocarbons ($C_1$-$C_4$).

15. The method for the integrated plant of claim 12, further comprising:

operating a hydrogen recirculation feedback loop to recover hydrogen gas from purge gas from the downstream methanol-synthesis-reactor train to be combined with the chemical grade syngas supplied from the tubular chemical reactor to control a methanol feed modulus ratio for a hydrogen to carbon monoxide ratio needed for methanol synthesis, and operating the downstream methanol-synthesis-reactor train to take in the chemical grade syngas as a chemical feedstock to generate methanol, operating a hydrogen pressure swing absorber to separate out the hydrogen gas from the purge gas from the methanol-synthesis-reactor train in order to recover the hydrogen gas from the purge gas, where any subsequent gasoline, diesel or jet fuel produced from the generated methanol in the methanol-to-gasoline reactor train or the high-temperature Fischer-Tropsch reactor train has a biogenic content between 50% and 100%.

16. The method for the integrated plant of claim 15, further comprising:

operating the biomass feed system to supply wood chips as the biomass through the one or more feed supply inputs, and operating the hydrogen pressure swing absorber to connect to the hydrogen recirculation feedback loop, where the hydrogen pressure swing absorber is configured to receive the purge gas from the downstream methanol-synthesis-reactor train and extract hydrogen gas, and then is configured to also supply extracted hydrogen to the methanol-to-gasoline reactor train to change any ratios of produced gasoline to get a desired octane rating needed for commercial gasoline, where the methanol-to-gasoline reactor train receives its methanol from the methanol-synthesis-reactor train, where the gasoline produced from the chemical grade syngas derived from the wood chips is 100% biogenic.

17. The method for the integrated plant of claim 12, further comprising:

operating the biomass feed system to supply wood chips as the biomass through the one or more feed supply inputs, and operating the $CO_2$ separation unit to connect to a carbon dioxide compressor to pressurize the $CO_2$ gas, where the carbon dioxide compressor connects to both i) lock-hoppers connecting to the one or more feed supply inputs of the first stage and ii) the biomass dryers connecting to the lock hoppers in order for the chemical grade syngas produced from the reactor output of the tubular chemical reactor of the second stage to have a 100% percent bio genic rating, where the lock hoppers are configured to use the CO2 gas to pressurize the wood chips; and thus, move the wood chips to go across a pressure boundary into the circulating fluidized bed reactor of the first stage of the bio reforming reactor.

18. The method for the integrated plant of claim 12, further comprising:

operating a steam methane reformer to generate a stream of exit gases selected from a group consisting of 1) hydrogen gas, 2) a hydrogen-rich syngas composition, in which a ratio of hydrogen-to-carbon monoxide is higher than a ratio generally needed for methanol synthesis, and 3) any combination of the two, to be mixed with a potentially carbon-monoxide-rich syngas composition, in which a ratio of carbon monoxide to hydrogen is higher than the ratio generally needed for methanol synthesis from the chemical grade syngas produced by the second stage, where a hydrogen Pressure Swing Absorber is configured to separate out the hydrogen gas from the purge gas from the methanol-synthesis-reactor train, and operating a syngas combiner and compression unit to receive chemical feedstock gas from all three of i) the chemical grade syngas produced by the second stage, ii) the exit gases from the steam methane reformer, and iii) the hydrogen from the hydrogen pressure swing absorber, to control a methanol feed modulus ratio for a hydrogen to carbon monoxide ratio needed for methanol synthesis.

19. The method for the integrated plant of claim 18, further including:

operating a natural gas conditioning unit, with a natural gas input as well as one or more purge gas inputs, where the natural gas conditioning unit is configured to receive purge gases from the hydrogen pressure swing absorber as well as purge gases from the methanol-to-gasoline reactor train, where these purge gas components are being used as a chemical feedstock to be mixed with another chemical feed stock of natural gas from the natural gas input, where an output from the natural gas conditioning unit supplies the mixed chemical feedstock into a chemical feed input for the steam methane reformer.

20. The method for the integrated plant of claim 12, operating the first stage to supply the raw syngas from the circulating fluidized bed reactor from the output from the circulating fluidized bed of the first stage to both i) the tubular chemical reactor of the second stage and ii) a fuel gas mixing and distribution unit to supply fuel gas to heaters of other plant components including the heaters of the second stage and heaters in the methanol-to-gasoline train.

* * * * *